US012810546B2

(12) United States Patent
Ramesh Babu et al.

(10) Patent No.: US 12,810,546 B2
(45) Date of Patent: Nov. 24, 2026

(54) ADAPTIVE BOUNDING VOLUME HIERARCHY REBUILD WITH BIASED COST FUNCTION

(71) Applicant: QUALCOMM Incorporated, San Diego, CA (US)

(72) Inventors: Adimulam Ramesh Babu, San Diego, CA (US); Srihari Babu Alla, San Diego, CA (US); Alfredo Olegario Saucedo, San Diego, CA (US); Avinash Seetharamaiah, San Diego, CA (US); Jonnala Gadda Nagendra Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 18/351,460

(22) Filed: Jul. 12, 2023

(65) Prior Publication Data

US 2025/0022204 A1 Jan. 16, 2025

(51) Int. Cl.
*G06T 17/00* (2006.01)
*G06T 7/62* (2017.01)
(Continued)

(52) U.S. Cl.
CPC .............. *G06T 17/005* (2013.01); *G06T 7/62* (2017.01); *G06T 15/005* (2013.01); *G06T 15/06* (2013.01);
(Continued)

(58) Field of Classification Search
CPC ....... G06T 17/005; G06T 7/62; G06T 15/005; G06T 15/06; G06T 15/08; G06T 2210/12; G06T 2210/21
See application file for complete search history.

(56) References Cited

U.S. PATENT DOCUMENTS

2009/0167763 A1* 7/2009 Waechter ................ G06T 15/40 345/426
2022/0270319 A1 8/2022 Doyle et al.
(Continued)

OTHER PUBLICATIONS

Bittner, Jiri & Havran, Vlastimil. (2009). RDH: Ray distribution heuristics for construction of spatial data structures. 10.1145/1980462. 1980475. (Year: 2009).*

(Continued)

*Primary Examiner* — Alicia M Harrington
*Assistant Examiner* — Christine Yera Ahn
(74) *Attorney, Agent, or Firm* — QUALCOMM Incorporated

(57) ABSTRACT

This disclosure provides systems, devices, apparatus, and methods, including computer programs encoded on storage media, for adaptive BVH rebuilds with biased cost functions for dynamic geometry. A graphics processor may obtain an indication of first BVH structure(s) including first nodes, where the first BVH structure(s) are representative of first geometry data for first primitives in first frame(s), where each of the first nodes is associated with first primitive(s), may detect a number of rays that intersect each of the first BVH structure(s) from direction(s) associated with the first frame(s), may update a cost function based on the number of rays and each of the direction(s), and may configure, based on the updated cost function, second BVH structure(s) including second nodes, where the second BVH structure(s) are representative of second geometry data for second primitives in second frame(s), where each of the second nodes is associated with second primitive(s).

30 Claims, 14 Drawing Sheets

(51) Int. Cl.
*G06T 15/00* (2011.01)
*G06T 15/06* (2011.01)
*G06T 15/08* (2011.01)

(52) U.S. Cl.
CPC .......... *G06T 15/08* (2013.01); *G06T 2210/12* (2013.01); *G06T 2210/21* (2013.01)

(56) References Cited

U.S. PATENT DOCUMENTS

2023/0252718 A1* 8/2023 Fenney ..................... G06T 1/20
2024/0202178 A1* 6/2024 Meister ............... G06F 16/2246

OTHER PUBLICATIONS

Wald, Ingo, Solomon Boulos, and Peter Shirley. "Ray tracing deformable scenes using dynamic bounding volume hierarchies." ACM Transactions on Graphics (TOG) 26.1 (2007): 6-es. (Year: 2007).*

Bittner J., et al., "T-SAH: Animation Optimized Bounding Volume Hierarchies", Computer Graphics Forum : Journal of the European Association for Computer Graphics, Wiley-blackwell, Oxford, vol. 34, No. 2, Jun. 22, 2015, XP071544908, pp. 527-536, p. 527-p. 530.

International Search Report and Written Opinion—PCT/US2024/035986—ISA/EPO—Sep. 11, 2024.

Meister D., et al., "A Survey on Bounding Volume Hierarchies for Ray Tracing", Computer Graphics Forum: Journal of the European Association for Computer Graphics, Wiley-blackwell, Oxford, vol. 40, No. 2, Jun. 4, 2021, XP071554288, pp. 683-712, The Whole Document.

Vinkler M., et al., "Visibility Driven BVH Build up Algorithm for Ray Tracing", Computers and Graphics, vol. 36, No. 4, Jun. 2012, XP093048214, pp. 283-296, Abstract, Section 1 Introduction, Section 4 The Cost Model with Occlusion Heuristic.

* cited by examiner

650

600

ADAPTIVE BOUNDING VOLUME HIERARCHY REBUILD WITH BIASED COST FUNCTION

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Currently, there is a need for improved graphics processing. For instance, acceleration structure traversal represents a significant percentage of ray tracing-related processing. Bounding volume hierarchies (BVHs) may be utilized to store geometry data for accelerating the ray tracing performance. The quality of BVHs may be correlated to surface area heuristics associated therewith, which may directly relate to the ray tracing performance. Accordingly, there has developed an increased need for improved surface area heuristics to further improve ray tracing performance.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processor (e.g., a graphics processing unit (GPU)) or any apparatus that may perform graphics processing. The apparatus may obtain an indication of a set of first bounding volume hierarchy (BVH) structures including a plurality of first nodes, where the set of first BVH structures is representative of first geometry data for a plurality of first primitives in a set of first frames, where each of the plurality of first nodes is associated with one or more first primitives of the plurality of first primitives. The apparatus may also determine a number of rays that intersect each of the set of first BVH structures from each of a set of directions associated with the set of first frames. Additionally, the apparatus may update a cost function based on the number of rays and each of the set of directions. The apparatus may also configure, based on the updated cost function, a set of second BVH structures including a plurality of second nodes, where the set of second BVH structures is representative of second geometry data for a plurality of second primitives in a set of second frames, where each of the plurality of second nodes is associated with one or more second primitives of the plurality of second primitives.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
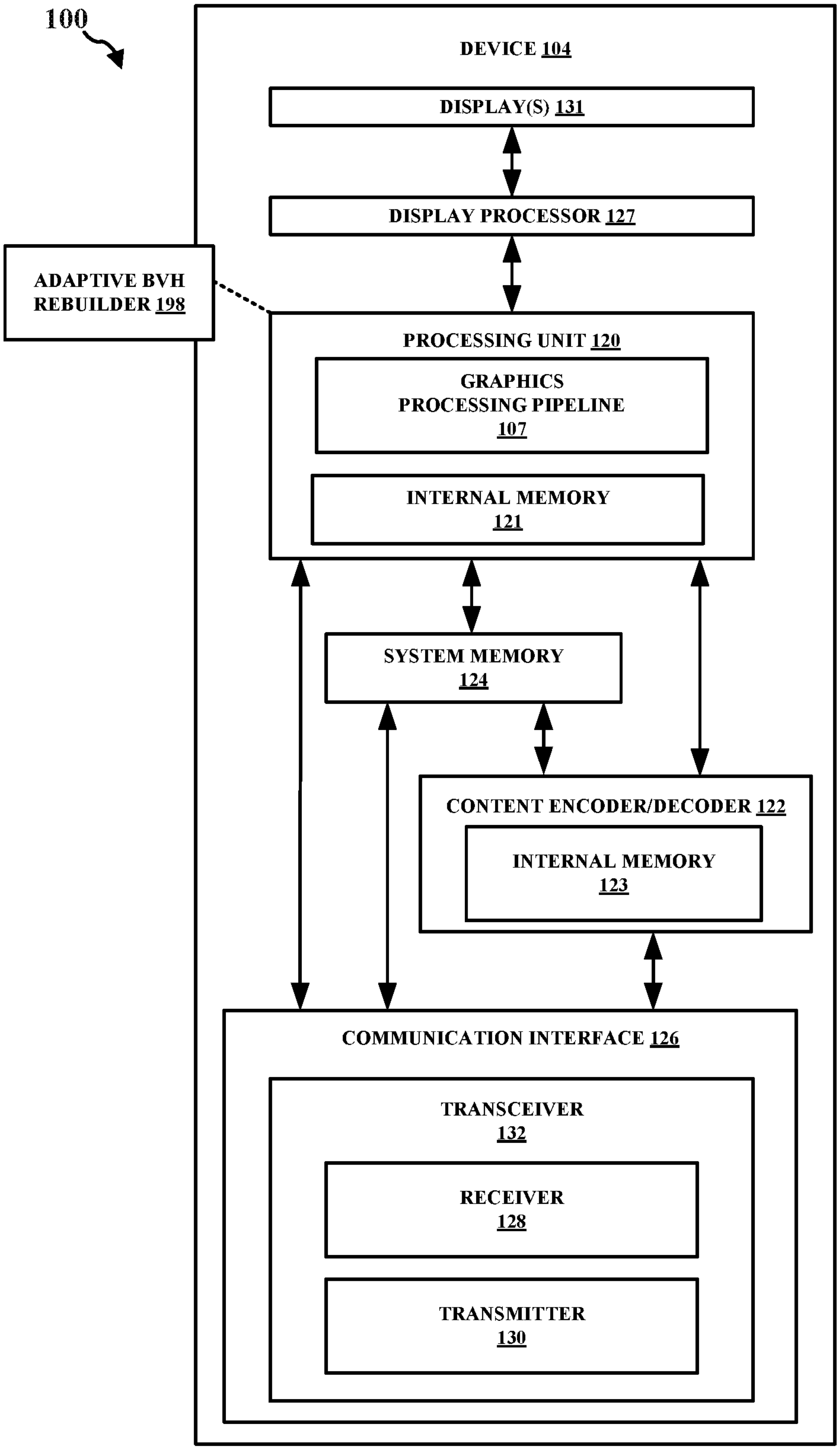
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

As described herein, acceleration structure traversal may represent a significant percentage of ray tracing-related processing. The quality of BVHs may be correlated to surface area heuristics associated therewith, which may directly relate to the ray tracing performance. In some aspects, if ray tracing is performed from all directions, then surface area heuristics may be minimized and ray tracing performance may be improved. However, performing ray tracing from all directions may be computationally expensive.

In accordance with various aspects of the present disclosure, ray tracing for a particular set of frames may be biased towards a particular direction based on information (e.g., ray tracing statistics) determined for a previous set of frames. For instance, such information may include the number of rays that intersect each of a set of BVH structures (representing scene objects) from each of a set of directions (e.g., an x-direction, a y-direction, and/or a z-direction) associated with a set of frames. In case of updateable geometry (e.g., due to object movement in a scene/frame), the information may indicate that the directions at which the rays intersect the object/geometry may be from one direction. A cost function (e.g., a surface area heuristic cost function) may be updated based on such information, thereby biasing the cost function to that direction. The biased cost function may be utilized when rebuilding the BVH structure for the scene object(s) in a subsequent set of frames. This may ensure that ray tracing for the scene object(s) is performed for a single direction for the subsequent set of frames, rather than for all directions. Aspects of the present disclosure may limit the amount of ray tracing computations for a scene object to a particular direction, which may result in the ray tracing being less computationally expensive, as compute resources (e.g., processing cycles, memory, power, etc.) are conserved. Accordingly, aspects of the present disclosure may reduce the amount of computational expenses for ray tracing operations.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include an adaptive BVH rebuilder 198 configured to obtain an indication of a set of first BVH structures including a plurality of first nodes, where the set of first BVH structures is representative of first geometry data for a plurality of first primitives in a set of first frames, where each of the plurality of first nodes is associated with one or more first primitives of the plurality of first primitives. The adaptive BVH rebuilder 198 may also be configured to determine a number of rays that intersect each of the set of first BVH structures from each of a set of directions associated with the set of first frames. The adaptive BVH rebuilder 198 may also be configured to update a cost function based on the number of rays and each of the set of directions. The adaptive BVH rebuilder 198 may also be configured to configure, based on the updated cost function, a set of second BVH structures including a plurality of second nodes, where the set of second BVH structures is representative of second geometry data for a plurality of second primitives in a set of second frames, where each of the plurality of second nodes is associated with one or more second primitives of the plurality of second primitives. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
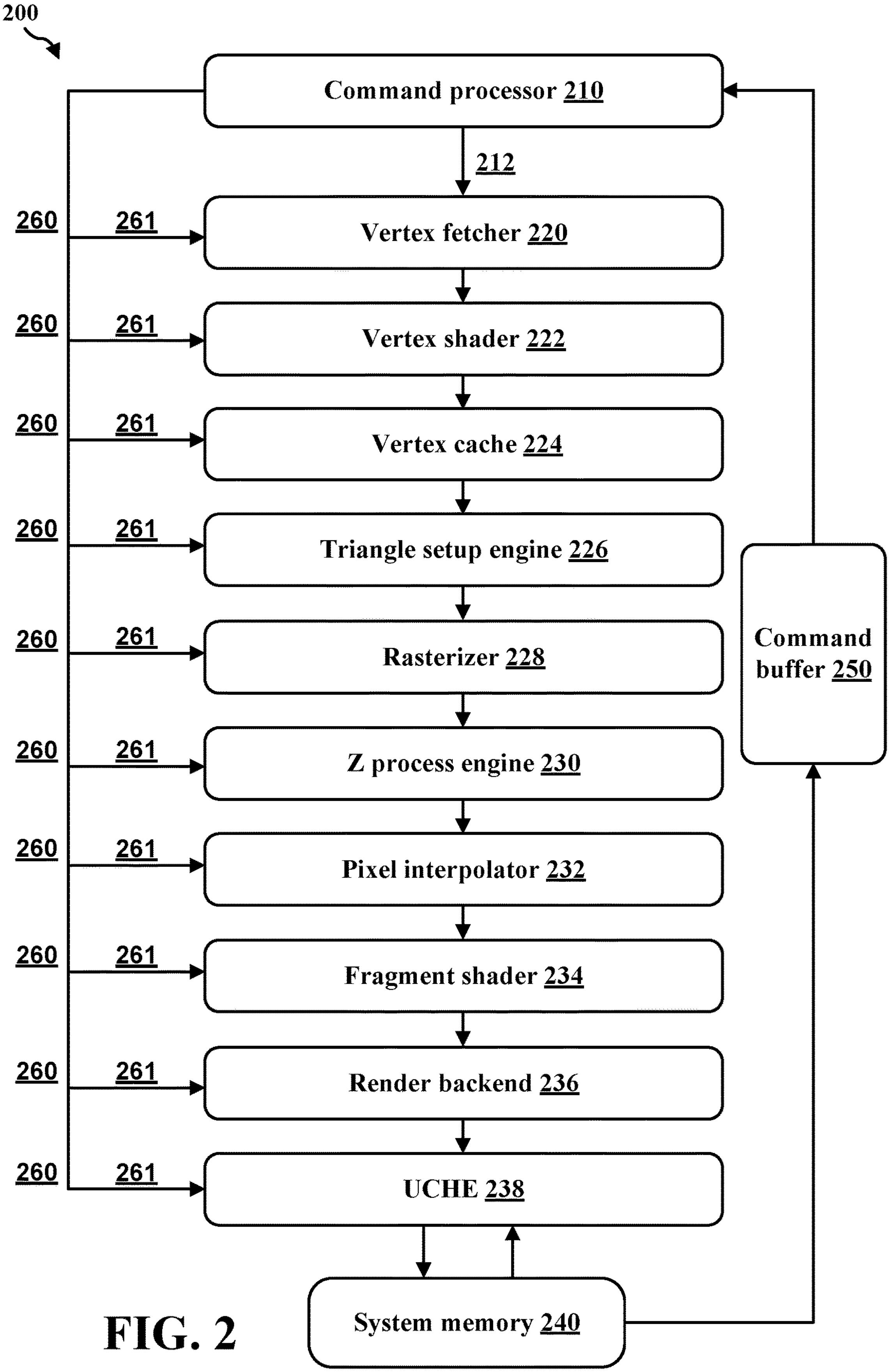
FIG. 2 illustrates an example graphics processor in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212. VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene (e.g., a sequence of one or more frames). By doing so, ray tracing can produce incredibly realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processor (e.g., a graphics processing unit (GPU)) or a central processing unit (CPU).

Figure 3:
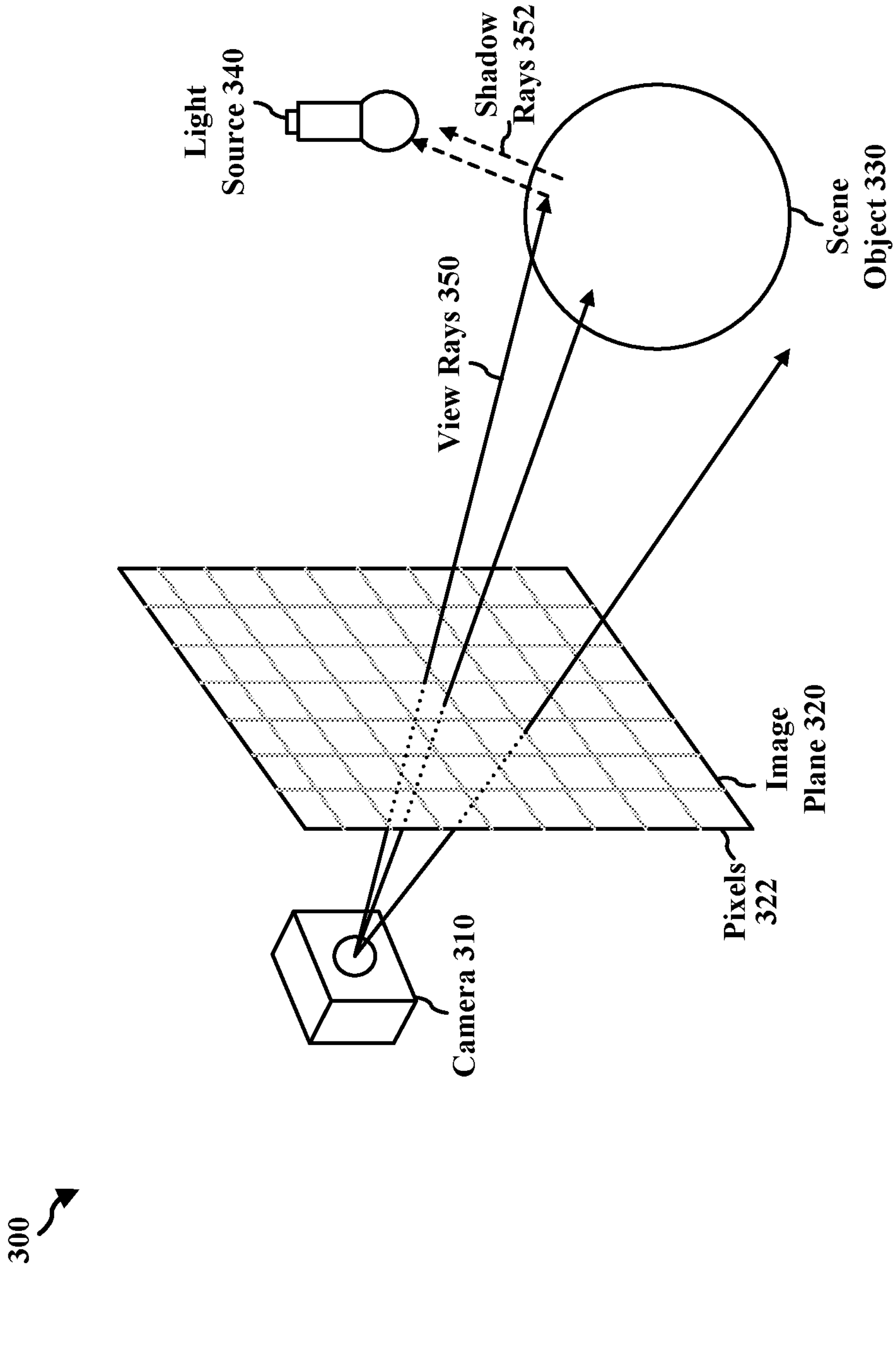
FIG. 3 is a diagram illustrating an example ray tracing process in accordance with one or more techniques of this disclosure.

FIG. 3 illustrates diagram 300 including one example of a ray tracing process. As shown in FIG. 3, diagram 300 includes a camera 310, an image plane 320 including pixels 322, a scene object 330, a light source 340, view rays 350, and shadow rays 352. FIG. 3 shows that view rays 350 are traced from the camera 310 and through the image plane 320. After passing the image plane 320, the view rays 350 are traced to the scene object 330. At least some of the view rays 350 are traced off of scene object 330 and are traced towards the light source 340 as the shadow rays 352. Accordingly, the shadow rays 352 and the view rays 350 may trace the light from light source 340. FIG. 3 depicts how ray tracing may generate an image by tracing the path of light (e.g., from the light source 340) for the pixels in an image plane (e.g., the pixels 322 in the image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or strike a certain primitive, then the pixel is shaded. In some instances of graphics processing, ray tracing algorithms may be performed alongside rasterization, such as via a hybrid ray tracing/rasterization model.

Figure 4A:
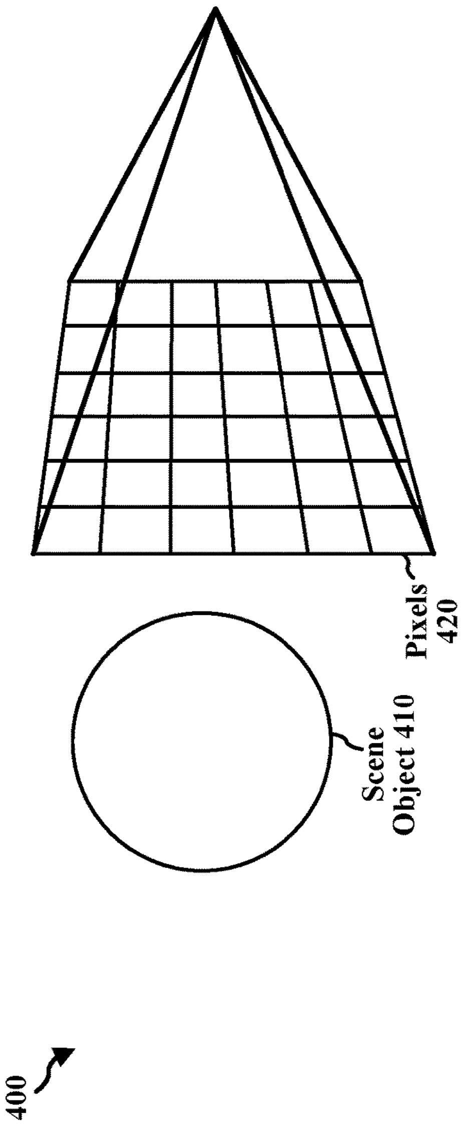
FIG. 4A is a diagram illustrating an example rasterization process in accordance with one or more techniques of this disclosure.
Figure 4B:
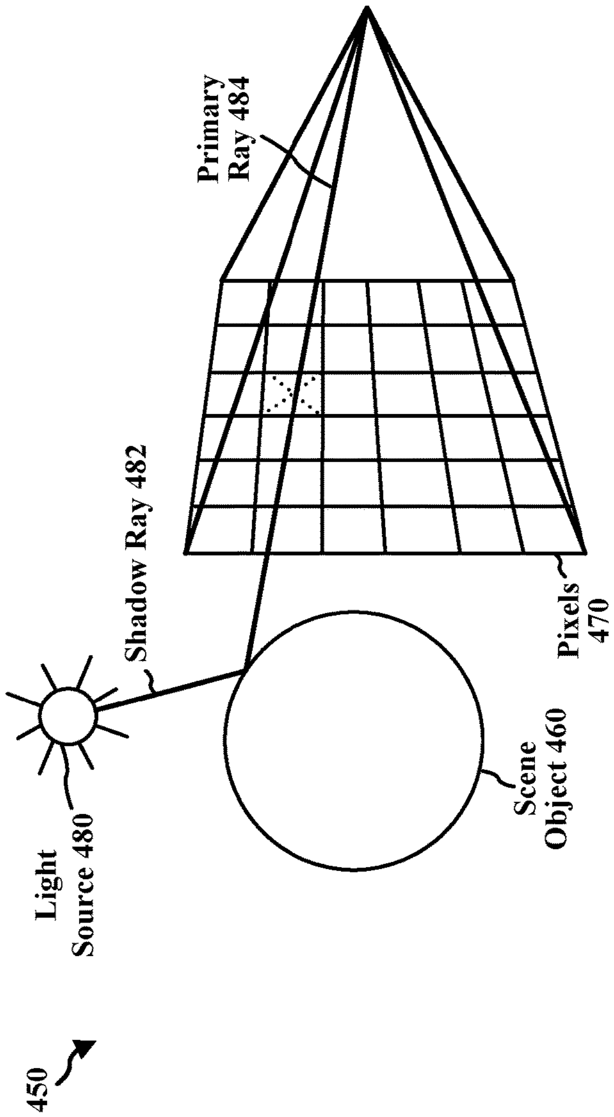
FIG. 4B is a diagram illustrating an example ray tracing process in accordance with one or more techniques of this disclosure.

FIGS. 4A and 4B illustrate a diagram 400 and diagram 450 including an example process of rasterization and an example process of ray tracing, respectively. As shown in FIG. 4A, the diagram 400 includes a scene object 410 and pixels 420. FIG. 4A depicts that the process of rasterization determines, for each of the pixels 420 in a scene including the scene object 410, a pixel is shaded if a portion of the pixel is covered by a primitive. As shown in FIG. 4B, the diagram 450 includes a scene object 460, pixels 470, a light source 480, a shadow ray 482, and a primary ray 484. FIG. 4B depicts that the process of ray tracing determines if a generated ray (e.g., the shadow ray 482) will hit or strike a certain primitive in the scene object 460 corresponding to one of the pixels 470 via the primary ray 484, then the pixel is shaded.

As indicated herein, the process of ray tracing may be performed by determining whether a ray will hit/strike any primitive(s) in a scene. For example, ray tracing algorithms may perform a simple query operation: Is a given ray going to hit/strike any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum time to strike primitives in a scene ($t_{min}$), a maximum time to strike primitives in a scene ($t_{max}$), and a calculated distance to strike primitives in the scene.

Figure 5:
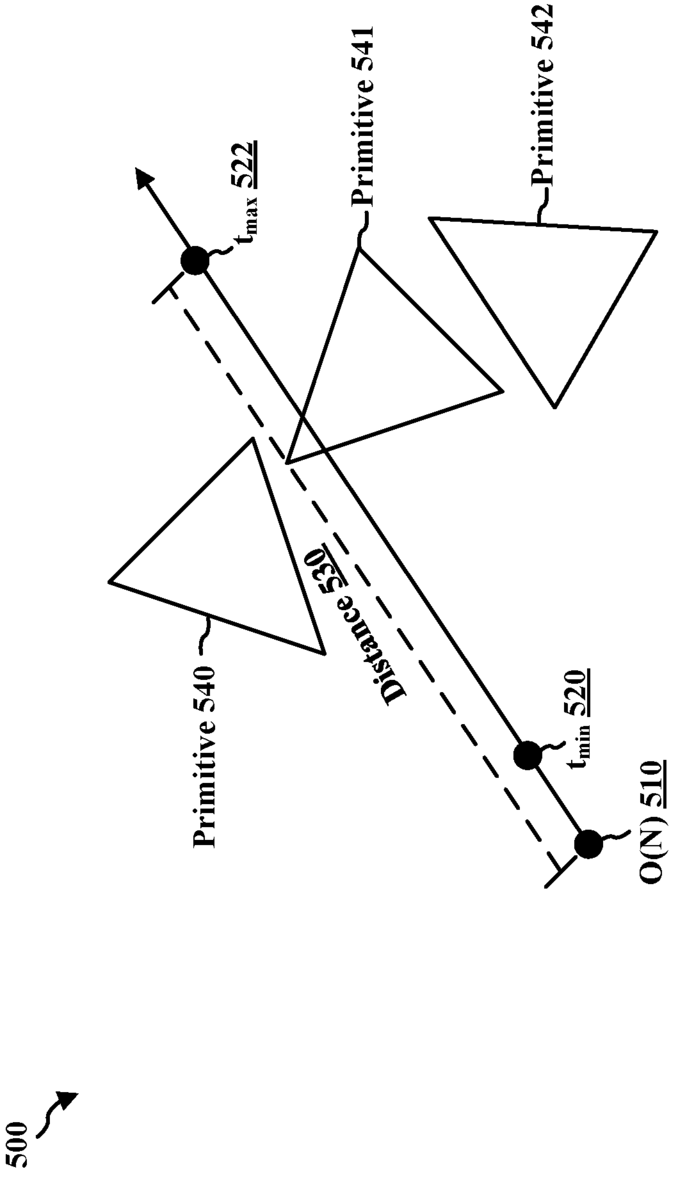
FIG. 5 is a diagram illustrating an example ray tracing process in accordance with one or more techniques of this disclosure.

FIG. 5 illustrates diagram 500 including one example of a ray tracing process. As shown in FIG. 5, the diagram 500 includes an origin point for a ray (O(N) 510), a minimum time to strike primitives in a scene ($t_{min}$ 520), a maximum time to strike primitives in a scene ($t_{max}$ 522), a calculated distance to strike primitives in the scene (distance 530), and a number of primitives (a primitive 540, a primitive 541, and a primitive 542) in the scene. FIG. 5 shows that ray tracing techniques may utilize a number of values to determine if a ray is going to hit a primitive. For instance, to determine if a ray will strike a primitive, ray tracing techniques may utilize an origin point for a ray (O(N) 510), a minimum time to strike primitives ($t_{min}$ 520), a maximum time to strike primitives ($t_{max}$ 522), a calculated distance to strike primitives (distance 530), and a number of primitives (the primitive 540, the primitive 541, and the primitive 542).

Ray tracing may utilize various data structures for accelerating a computational process, such as a bounding volume hierarchy (BVH). In a bounding volume hierarchy, primitives are held in leaf nodes. Further, internal nodes may hold access aligned bounding boxes (AABBs) that enclose certain leaf node geometry. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log (N).

Figure 6B:
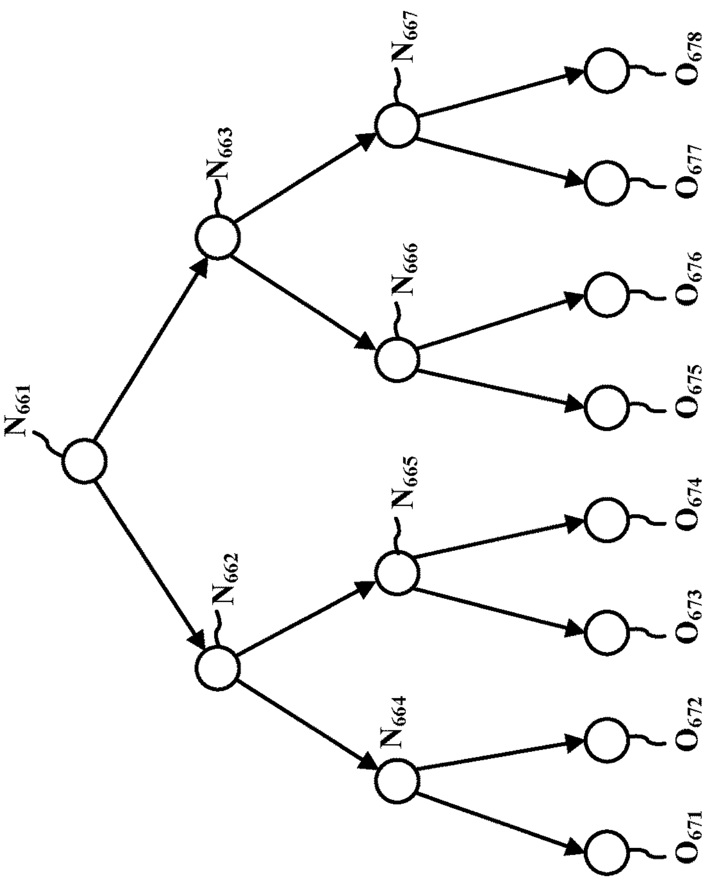
FIG. 6B is a diagram illustrating an example data structure in accordance with one or more techniques of this disclosure.
Figure 6A:
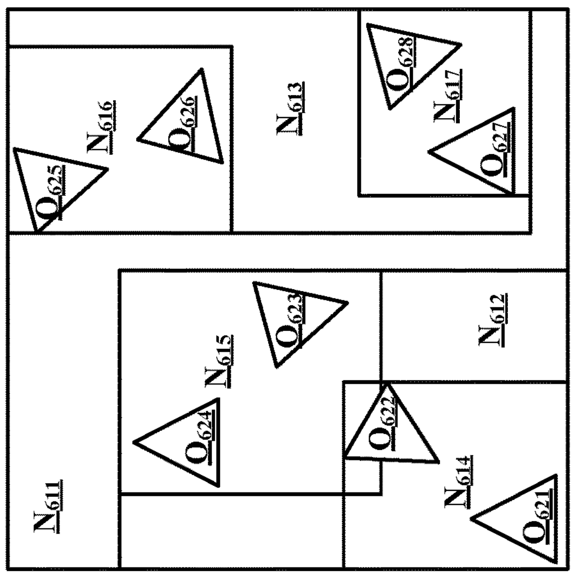
FIG. 6A is a diagram illustrating an example data structure in accordance with one or more techniques of this disclosure.

FIGS. 6A and 6B illustrate a diagram 600 and a diagram 650, respectively, including example data structure techniques utilized in ray tracing. As shown in FIG. 6A, the diagram 600 includes a number of nodes (internal nodes $N_{611}$-$N_{617}$) and a number of primitives (primitives $O_{621}$-$O_{628}$). FIG. 6A depicts a ray-box intersection for internal nodes $N_{611}$-$N_{617}$ and primitives $O_{621}$-$O_{628}$. As shown in FIG. 6B, the diagram 650 includes a number of nodes (leaf nodes $N_{661}$-$N_{667}$) and a number of primitives (primitives $O_{671}$-$O_{678}$). FIG. 6B depicts a ray-triangle test for leaf nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process. For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \log n}$ solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (i.e., an initial BVH) to a wide BVH that is wider than the binary tree or initial BVH. For example, hierarchy in the initial BVH may include three levels, where the primitives are included in a third level of the hierarchy. The hierarchy in the wide BVH may include two levels, where the primitives are included in a second level of the hierarchy. In some instances of BVH widening, the wide BVH may include an internal node with a certain amount of AABBs (e.g., up to eight AABBs) and a leaf node with a certain amount of primitives/triangles (e.g., up to four primitives/triangles).

Figure 7A:
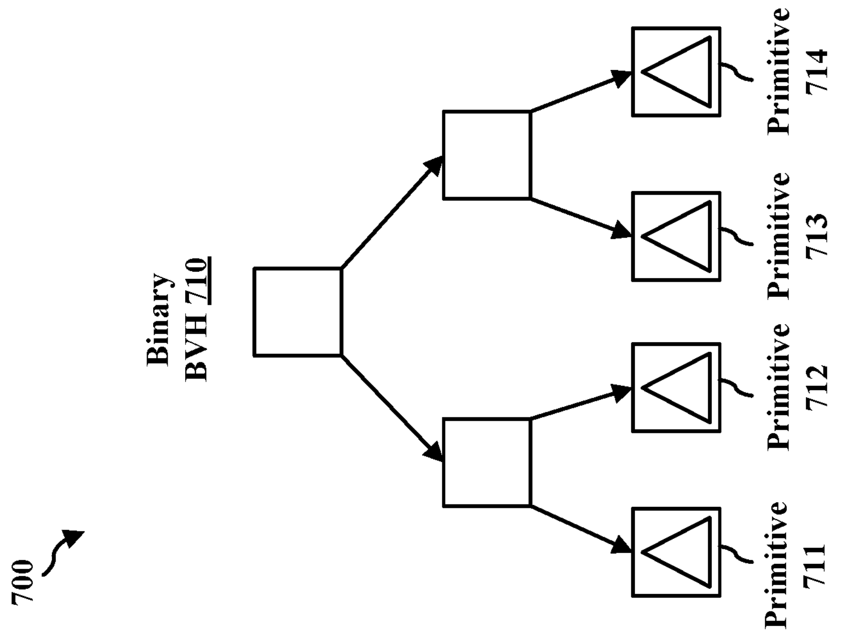
FIG. 7A is a diagram illustrating an example bounding volume hierarchy (BVH) in accordance with one or more techniques of this disclosure.
Figure 7B:
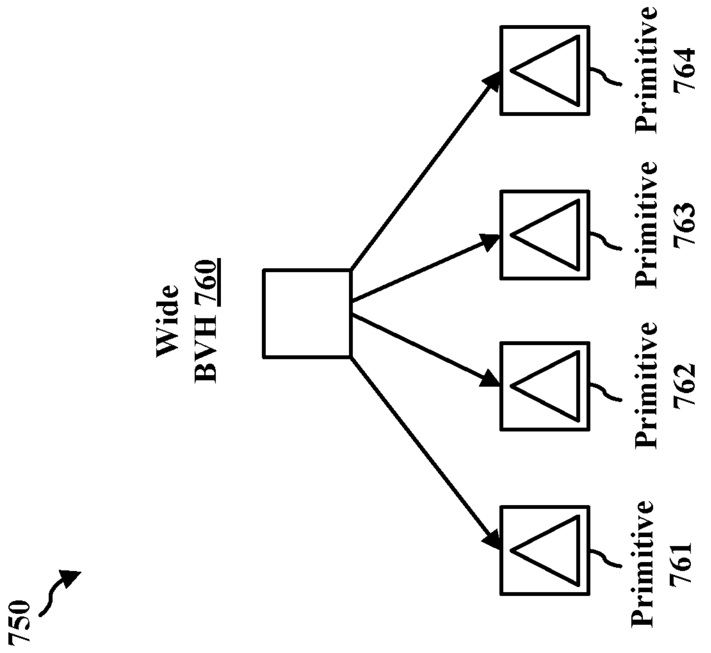
FIG. 7B is a diagram illustrating another example BVH in accordance with one or more techniques of this disclosure.

FIGS. 7A and 7B illustrate a diagram 700 and a diagram 750 including a binary bounding volume hierarchy and a wide bounding volume hierarchy, respectively. As shown in FIG. 7A, the diagram 700 includes a binary bounding volume hierarchy 710 including a primitive 711, a primitive 712, a primitive 713, and a primitive 714. FIG. 7A depicts that the binary bounding volume hierarchy 710 includes three levels, where the primitives 711-714 are in the third level of the hierarchy. As shown in FIG. 7B, the diagram 750 includes a wide bounding volume hierarchy 760 including a primitive 761, a primitive 762, a primitive 763, and a primitive 764. FIG. 7B depicts that the wide bounding volume hierarchy 760 includes two levels, where the primitives 761-764 are in the second level of the hierarchy. As shown in FIGS. 7A and 7B, the binary bounding volume hierarchy 710 may undergo a process of bounding volume hierarchy widening that results in the wide bounding volume hierarchy 760.

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software (e.g., GPU/CPU hardware or software). For instance, in certain stages, a driver may construct the BVH on a CPU or a graphics processor (e.g., a BVH construction stage and a BVH node compression stage). In a BVH traversal stage, the BVH traversal may occur in the shader at the graphics processor. Also, certain stages may be implemented in the graphics processor hardware (e.g., a BVH node decompression stage, a ray-bounding box intersection stage, and a ray-triangle intersection stage).

Aspects of graphics processing may store ray tracing data in different types of memory, e.g., a system memory. However, one potential issue for ray tracing performance is the amount of memory bandwidth available, as accessing data from memory (e.g., the system memory) may take a large amount of access cycles. In some instances, geometry data may be stored in an acceleration structure (e.g., a bounding volume hierarchy (BVH) structure). The geometry data may represent information about one or more primitives (e.g., a triangle, axis-aligned bounding box (AABB), etc.). For example, geometry data may be data or information regarding objects in a scene/frame. The information may include information pertaining to the edges, the faces/surfaces, the vertices, etc. The information may also include information pertaining to the positions or location of the primitives. An acceleration structure or BVH structure is a tree structure including multiple nodes (e.g., a binary tree structure or a n-ary tree structure), where primitive data is stored in leaf nodes (i.e., the bottom nodes in the branches of the tree structure) and bounding boxes in the internal nodes. A node may refer to a building block of an acceleration structure which encapsulates the subset of geometry in the scene. A ray may be any of a set of straight lines that pass through a point or node in the acceleration structure or BVH structure during the ray tracing process. For each ray in a ray tracing process, the graphics processor may traverse from the root node (i.e., the top node in the tree structure) to the leaf nodes. The BVH structure may be associated with graphics processing scenes that include a number of primitives. Also, each of these primitives may correspond to one of the nodes in the BVH structure. For example, for some scenes, a BVH structure associated with the scene may hold a large number of primitives (e.g., millions of primitives).

Bounding volume hierarchies and similar data structures are an efficient manner in which to store the geometry data for accelerating ray tracing performance. Although binary BVHs with a single primitive in a leaf node and one bounding box in an internal node may be helpful to improve ray tracing performance, increasing the width of BVHs to certain levels may improve the performance of ray tracing at a graphics processor. For example, increasing the width of BVHs to certain levels (e.g., an 8-wide BVH with up to 8 child nodes and up to 4 primitives in leaf nodes) based on surface area heuristics (SAH) may improve the performance of ray tracing at a graphics processor. For instance, in order to estimate the cost of a particular split of a BVH, a surface area heuristic cost function may be utilized. The surface area heuristic may rely on the assumption that rays are uniformly distributed throughout the scene in all directions. Using the surface area heuristic, the cost of tracing a ray through a particular node and its children may be estimated. The surface area heuristic may help to find a good split position, and may also be used as a termination criterion for node subdivision. For example, a leaf node may be created whenever the cost for splitting the node is higher than the cost of sequentially intersecting all primitives.

In some aspects, rather than building all the geometry to a single BVH, some types of application program interfaces (APIs) may split the geometry to multiple bottom-level BVHs (i.e., one or more sections of a BVH that are below another section of the BVH) which contain the primitive geometry (e.g., triangles or bounding boxes) and a top-level BVH (i.e., one or more sections of a BVH that are above another section of the BVH). In some instances, a top-level BVH may be formed with the bottom-level BVH references. Also, splitting the geometry between bottom-level BVHs and creating a top level BVH may increase the flexibility and reusability of the geometry, as well as increase the surface area heuristic (SAH) of the overall structure. In some aspects, a bottom-level BVH may store multiple primitives in its leaf node, whereas a top-level BVH may store just one bottom-level BVH in its leaf node. For instance, a top-level BVH may store one bottom-level BVH in its leaf node due to the additional information that is utilized, so multiple bottom-level BVHs may not be able to be stored in a top-level BVH leaf node. Also, in the case where geometry is not split properly across the bottom-level BVH, the SAH and ray tracing performance may be degraded. For example, geometry from different parts of a scene may be added to a BVH and not split properly across the bottom-level BVH, such that the SAH and ray tracing performance may be degraded.

Figure 8:
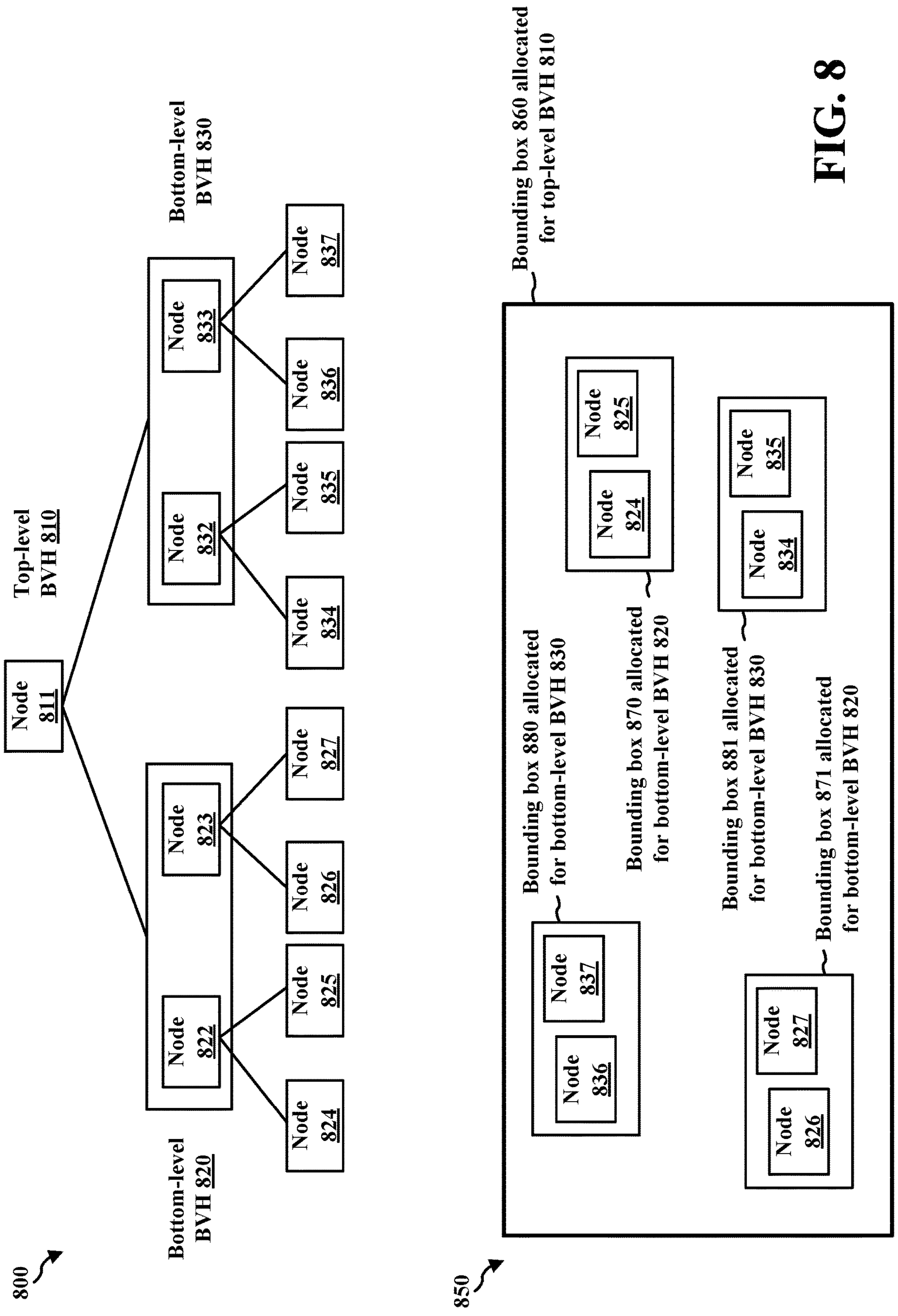
FIG. 8 is a diagram illustrating an example tree structure for node storage and an example of bounding boxes for corresponding internal nodes for a BVH in accordance with one or more techniques of this disclosure.

FIG. 8 illustrates a diagram 800 including one example of a tree structure for node storage, as well as a diagram 850 including an example of bounding boxes for corresponding internal nodes in a BVH. More specifically, the diagram 800 includes a top-level BVH structure and two bottom-level BVH structures for storing different nodes of the structures. As shown in FIG. 8, the diagram 800 includes a node in a top-level BVH structure 810 (e.g., a node 811), nodes in a bottom-level BVH structure 820 (e.g., a node 822, a node 823, a node 824, a node 825, a node 826, and a node 827), and nodes in a bottom-level BVH structure 830 (e.g., a node 832, a node 833, a node 834, a node 835, a node 836, and a node 837). In some aspects, the top-level BVH structure 810, the bottom-level BVH structure 820, and the bottom-level BVH structure 830 may be considered part of the same BVH structure, such that all of the nodes shown in the diagram 800 are in the same BVH structure. As depicted in FIG. 8, the nodes in the top-level BVH structure 810, the bottom-level BVH structure 820, and the bottom-level BVH structure 830 may be stored in different types of memory, such as a graphics memory (GMEM) or a system memory (SYSMEM). Further, each of the nodes depicted in FIG. 8 (e.g., the node 811, the node 822, the node 823, the node 824, the node 825, the node 826, the node 827, the node 832, the node 833, the node 834, the node 835, the node 836, and the node 837) may correspond to a bounding box.

As further shown in FIG. 8, the diagram 850 includes a bounding box calculated for the top-level BVH structure 810, the bottom-level BVH structure 820, and the bottom-level BVH structure 830. For instance, the diagram 850 includes a bounding box 860 that is calculated for the top-level BVH structure 810 (e.g., the node 811 in the top-level BVH structure 810), a bounding box 870 that is calculated for the bottom-level BVH structure 820 (e.g., the node 824 and the node 825 in the bottom-level BVH structure 820), and a bounding box 880 that is calculated for the bottom-level BVH structure 830 (e.g., the node 836 and the node 837 in the bottom-level BVH structure 830). For example, as shown in the diagram 850, the data for some nodes in the bottom-level BVH structure 820 (e.g., data for the node 824 and the node 825) may be allocated to the bounding box 870, and the data for other nodes in the bottom-level BVH structure 820 (e.g., data for the node 826 and the node 827) may be allocated to the bounding box 871. Further, the data for some nodes in the bottom-level BVH structure 830 (e.g., data for the node 836 and the node 837) may be allocated to the bounding box 880, and the data for other nodes in the bottom-level BVH structure 830 (e.g., data for the node 834 and the node 835) may be allocated to the bounding box 881.

As shown in FIG. 8, the geometry data for nodes in the bottom-level BVH structure 820 (e.g., data for the node 824, the node 825, the node 826, and the node 827) and the geometry data for nodes in bottom-level BVH structure 830 (e.g., data for the node 834, the node 835, the node 836, and the node 837) are included in the bounding box 860. This geometry data of the bottom-level BVH structure 820 and the bottom-level BVH structure 830 may be spread across the bounding box 860.

In some aspects, a BVH structure may store geometry data for a plurality of different scene objects. In other aspects, a BVH structure may store geometry data for a single scene object. In further aspects, one BVH structure may store static geometry data (e.g., geometry data for scene objects that are not deformable or that do not move change) and another BVH structure may store dynamic geometry data (e.g., geometry data for scene objects that are deformable or that move or change). In some instances, aspects presented herein may add a mechanism in a graphics processor (e.g., GPU) hardware or shader in order to track the direction of rays that may have been hit on a bottom level BVH and count the rays that have been hit in a certain direction (e.g., the x-direction, y-direction, and/or z-direction). The count may be used to determine whether to rebuild the BVH. In case of updatable geometry, the BVH may be rebuilt to maintain the quality of the BVH. The count may also be used to decide the surface area heuristics cost function in the BVH. A cost function may be a formula that is used during the construction of BVH to determine the distribution of the geometry into various nodes.

In accordance with various aspects of the present disclosure, the number of rays that intersect each of a set of BVH structures (e.g., the bottom-level BVH structures) from each of a set of directions (e.g., an x direction, a y direction, and a z direction) associated with a set of frames may be determined. A cost function (e.g., a surface area heuristic cost function) may be updated based on the determined number of rays and each of the set of directions. In case of updateable geometry (e.g., due to a character walking across a scene), the BVH would be rebuilt frequently to maintain the quality of the BVH based on the cost function. That is, when rebuilding the BVH structure, the direction at which the rays are intersecting an object from a previous frame are known. This information may be utilized to optimize the cost function to that direction (i.e., a bias is added to the cost function associated with the direction). The bias refers to an intentional adjustment or modification made to the function to favor certain outputs. This ensures that ray tracing is performed for that direction in subsequent frame(s), thereby achieving better performance than re-building a BVH structure utilizing a generic cost function (i.e., a cost function that is not biased in the direction at which rays are intersecting an object in a previous frame).

In some aspects, the cost function may be biased with a particular direction in accordance with Equation 1, which is provided below:

$$\text{cost function} = \frac{(n(x)S(yz) + n(y)S(xz) + n(z)S(xy))}{n(x) + n(y) + n(z)} \quad \text{(Eq. 1)}$$

where n(x) represents the number of rays that intersect a particular BVH structure from the x direction, n(y) represents the number of rays that intersect a particular BVH structure from the y direction, n(z) represents the number of rays that intersect a particular BVH structure from the z direction, S(yz) represents a surface area of yz face (or surface) of a AABB of a BVH node, S(xz) represents a surface area of an xz face of the AABB of the BVH node, and S(xy) represents a surface area of an xy face of a AABB of a BVH node. n(x), n(y), and n(z) may be referred to as bias constants.

Figure 9:
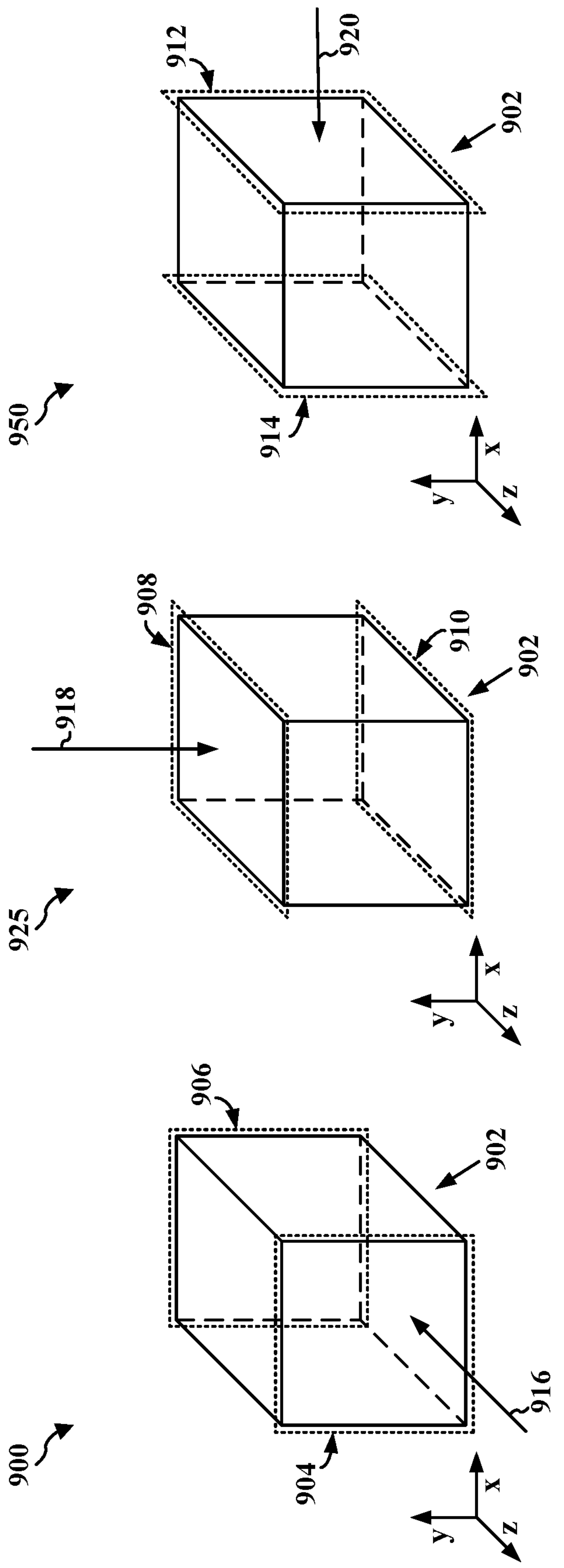
FIG. 9 are diagrams illustrating rays intersecting different surface of a scene object in accordance with one or more techniques of this disclosure.

For instance, FIG. 9 depict diagrams 900, 925, and 950 illustrating rays intersecting different surfaces of a scene object 902. As shown in FIG. 9, the scene object 902 may have a plurality of two-dimensional surfaces. For instance, a first surface 904 and an opposing second surface 906 may be on the xy plane (and may be referred to as xy surfaces), a third surface 908 and an opposing fourth surface 910 and may be on the xz plane (and may be referred to as xz surfaces), and a fifth surface 912 and an opposing sixth surface 914 may be on the yz plane (and may be referred to as yz surfaces). As also shown in FIG. 9, a ray 916 may intersect the first surface 904, a ray 918 may intersect the third surface 908, and a ray 920 may intersect the fifth surface 912.

Figure 10:
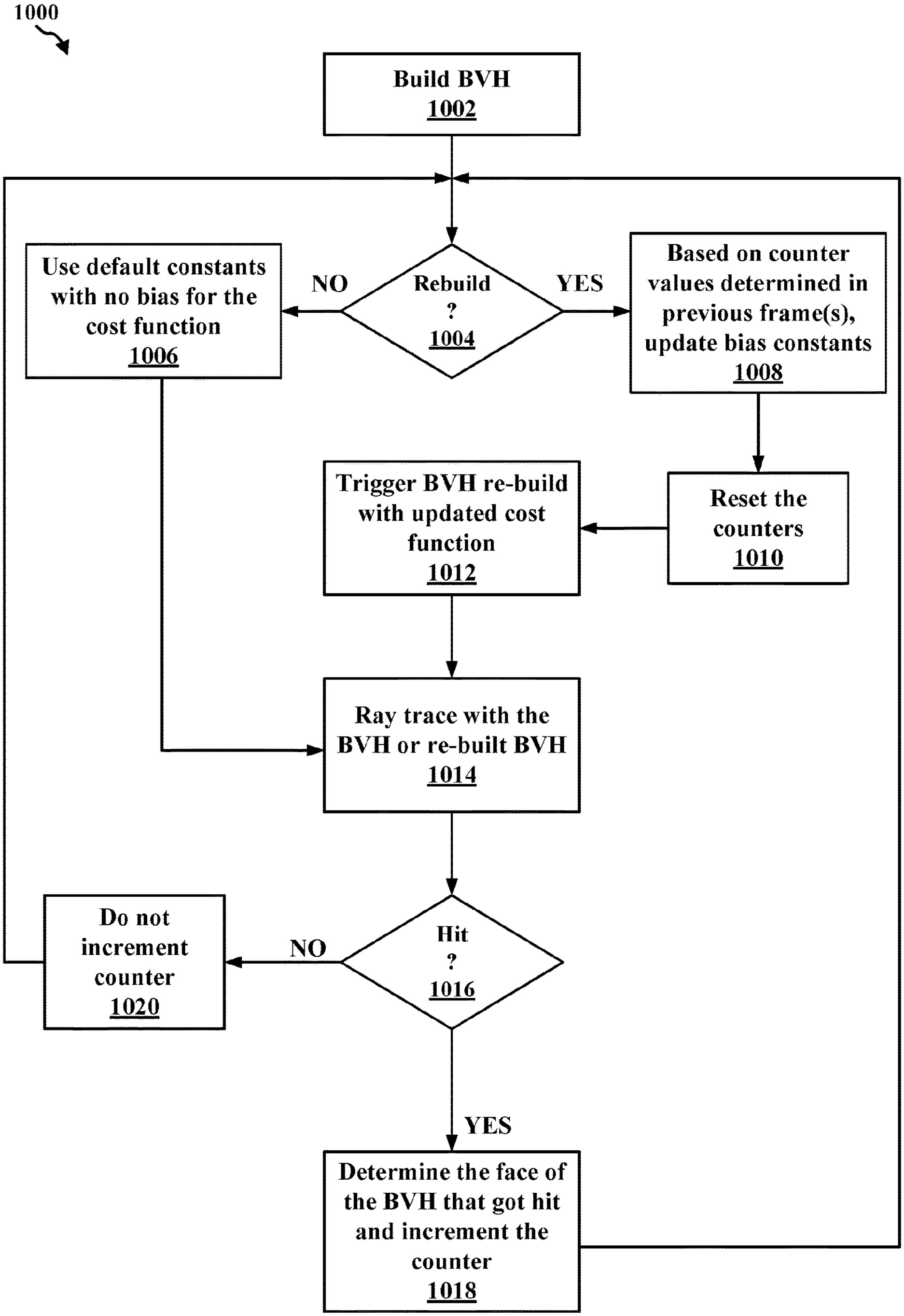
FIG. 10 is a flow diagram for updating a cost function in accordance with one or more techniques of this disclosure.

FIG. 10 depicts a flow diagram 1000 for updating a cost function in accordance with various aspects of the present disclosure. In some aspects, the steps of the flow diagram 1000 may be performed by a graphics processor (or by certain functionality of the graphics processor, such as the shader of the graphics processor). As shown in FIG. 10, at 1002, a BVH structure is built (e.g., generated), for example, for an initial scene. For instance, the graphics processor may receive an indication of a plurality of primitives for a set of frames, and the BVH structure may be built based on the indication of the plurality of primitives.

At 1004, a determination is made as to whether the BVH structure is to be re-built, for example, for a subsequent (or other) set of frames to be rendered. For instance, the graphics processor may determine whether a scene object in the set of frames is dynamic (i.e., the scene object is associated with dynamic geometry data). For instance, the graphics processor may analyze the geometry data of the scene object and determine whether the scene object is changing or moving. In response to a determination that the scene object is not dynamic (i.e., the scene object is static), flow continues to 1006. Otherwise, flow continue to 1008.

At 1006, the cost function (e.g., a surface area heuristic cost function) utilized to build the BVH structure associated with the scene object is not updated (i.e., default values (or constants) with no directional bias are utilized for the cost function).

At 1008, the bias constants of the cost function (e.g., n(x), n(y), and n(z) of Equation 1 may be updated based on counter values determined in a previous set of frame(s). For instance, the graphics processor may maintain counters that track the number of rays that intersect a particular surface of the scene object represented by the BVH structure. The graphics processor may maintain a first counter that tracks the number of rays that intersects a particular surface (e.g., the yz surface) of the scene object from a first direction (e.g., the x direction), a second counter that tracks the number of rays that intersects a particular surface (e.g., the xz surface) from a first direction (e.g., the y direction), and a third counter that tracks the number of rays that intersects a particular surface (e.g., the xy surface) from a first direction (e.g., the z direction). The first counter may be incremented each time a ray from the x direction intersects the yz surface, the second counter may be incremented each time a ray from the y direction intersects the xz surface, and the third counter may be incremented each time a ray from the z direction intersects the xy surface.

At 1010, the counters may be reset so that the number of rays may be tracked for another set of frames.

At 1012, the BVH structure associated with the dynamic scene object is re-built utilizing the updated cost function. For example, the bias constants of the cost function of Equation 1 updated utilizing the counter values at 1008 may be utilized to re-build the BVH structure. The re-built BVH structure may be representative of geometry data for primitives of the scene object in the subsequent set of frames for which BVH structure is re-built. The re-built BVH structure may include a set of nodes, where each set of the nodes is associated with primitive(s) of the subsequent set of frames.

At 1014, ray tracing is performed utilizing either the re-built BVH structure or the original BVH structure. For instance, if the cost function is updated at 1008, then ray tracing is performed utilizing the BVH structure re-built at 1012. If the cost function was not updated (i.e., the default constants are utilized for the cost function at 1006), then ray tracing is performed utilizing the original BVH structure built at 1002.

At 1016, a determination is made as to whether a ray hits (i.e., intersects) a particular surface of the scene object in the subsequent set of frames. If a determination is made that a ray hits a particular surface of the scene object, flow continues to 1018. Otherwise, flow continues to 1020.

At 1018, the graphics processor may determine the face (or surface) of the scene object represented by the BVH structure that was hit by the ray and increments the corresponding counter. For instance, the first counter may be incremented if the ray intersects the yz surface, the second counter may be incremented if the ray intersects the xz surface, and the third counter may be incremented if the ray intersects the xy surface. Flow may then continue to 1004.

At 1020, the counters may not be incremented. The flow may then continue to 1004.

Figure 11:
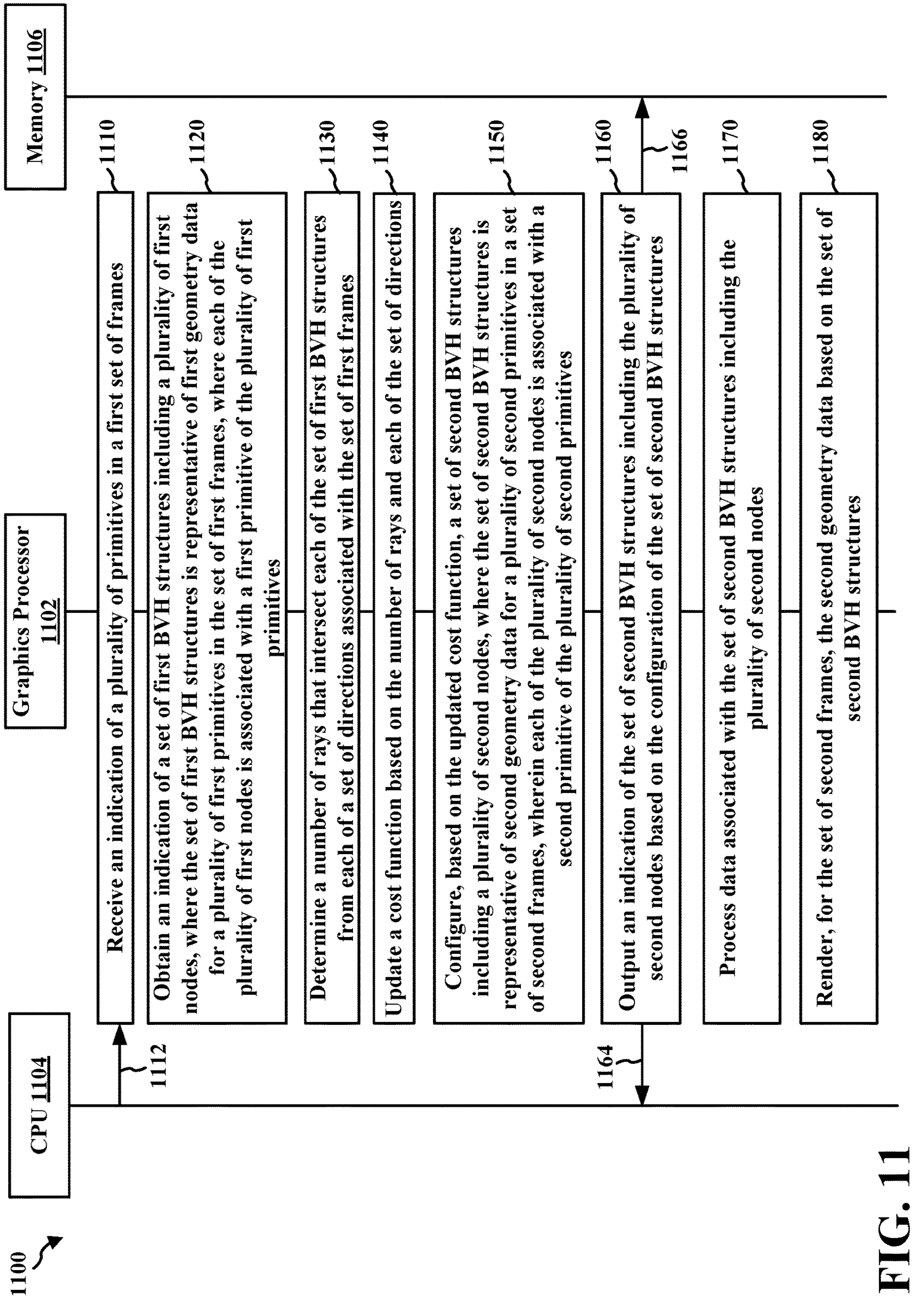
FIG. 11 is a communication flow diagram illustrating example communications between a graphics processor, a CPU, and a memory in accordance with one or more techniques of this disclosure.

FIG. 11 is a communication flow diagram 1100 of graphics processing in accordance with one or more techniques of this disclosure. As shown in FIG. 11, the diagram 1100 includes example communications between a graphics processor 1102 (or other graphics processor, such as a GPU), a CPU 1104 (or other central processor) or another GPU component, and memory 1106 (e.g., GMEM or SYSMEM), in accordance with one or more techniques of this disclosure.

At 1110, the graphics processor 1102 may receive an indication of a plurality of primitives 1112 of a set of first frames (e.g., a first or current scene), for example, from the CPU 1104.

At 1120, the graphics processor 1102 may obtain an indication of a set of first BVH structures including a plurality of first nodes, where the set of first BVH structure is representative of first geometry data for a plurality of first primitives in the set of first frames, where each of the plurality of first nodes is associated with one or more first primitives of the plurality of first primitives.

At 1130, the graphics processor 1102 may determine a number of rays that intersect each of the set of first BVH structures from each of a set of directions associated with the set of first frames. In some aspects, graphics processor 1102 may determine the number of rays by determining that the first geometry data includes the dynamic geometry data and detecting the number of rays based on the determination that the first geometry data includes the dynamic geometry data. For instance, the graphics processor 1102 may detect the number of rays if the first geometry data includes the dynamic geometry data.

At 1140, the graphics processor 1102 may update a cost function based on the number of rays and each of the set of directions. In some aspects, the cost function is a surface area heuristic cost function, and the updated cost function is an updated surface area heuristic cost function. Further, updating the cost function based on the number of rays and each of the set of directions may comprise (i.e., include) updating the SAH cost function based on the number of rays and each of the set of directions. In some aspects, updating the cost function includes adding a bias to the cost function associated with a certain direction in the set of directions. For example, the cost function is biased based on the directions from which the rays intersect the scene object.

In some aspects, to update the cost function, the graphics processor 1102 may identify a first surface area of a first surface (e.g., an xy surface) associated with each of the set of first BVH structures that a first subset of the number of rays intersect; and may identify a second surface area of a second surface (e.g., a yz surface) associated with each of the set of first BVH structures that a second subset of the number of rays intersect. That is, the graphics processor 1102, for each surface of a particular scene object, may identify the surface area of the surface that a subset of the number of rays intersect. In some aspects, updating the cost function may include means for combining the number of rays that intersect each of the set of first BVH structures from each of the set of directions with at least one of the first surface area or the second surface area. Also, graphics processor 1102 may identify a third surface area of a third surface (e.g., an xz surface) associated with each of the set of first BVH structures that a third subset of the number of rays intersect. That is, the graphics processor 1102, for each surface of a particular scene object, may identify the surface area of the surface that a subset of the number of rays intersect. The graphics processor 1102 may combine the number of rays that intersect each of the set of first BVH structures from each of the set of directions with at least one of the first surface area, the second surface area, or the third surface area. For instance, as shown in Equation 1, the number of rays that intersect a particular BVH structure (representing the scene object) from the x direction (n(x)) may be multiplied by the surface area of the yz surface (S(yz)), the number of rays that intersect the particular BVH structure from the y direction (n(y)) may be multiplied by the surface area of the xz surface (S(xz)), and the number of rays that intersect the particular BVH structure from the z direction (n(z)) may be multiplied by the surface area of the xy surface (S(xy)). The respective products may be summed together and divided by the sum of the number of rays that intersect the particular BVH structure from the x direction (n(x)), the number of rays that intersect the particular BVH structure from the y direction (n(y)), and the number of rays that intersect the particular BVH structure from the z direction (n(z)). In some aspects, the graphics processor 1102 may output an indication of the combined number of rays that intersect each of the set of first BVH structures from each of the set of directions with at least one of the first surface area, the second surface area, or the third surface area. Moreover, outputting the indication of the combined number of rays may comprise transmitting the indication of the combined number of rays; or storing the indication of the combined number of rays.

In some aspects, the first surface may be associated with a first dimension (e.g., the x dimension) and a second dimension (e.g., the y dimension), the second surface may be associated with the second dimension and a third dimension (e.g., the z dimension), and the third surface is associated with the first dimension and the third dimension.

At 1150, the graphics processor 1102 may configure, based on the updated cost function, a set of second BVH structures including a plurality of second nodes, where the set of second BVH structures is representative of second geometry data for a plurality of second primitives in a set of second frames, where each of the plurality of second nodes is associated with one or more second primitives of the plurality of second primitives. For instance, the cost function may be optimized to a particular direction, which may cause the set of second BVH structures to be configured such that just the primitives that are intersected by ray(s) from the particular direction are traversed and processed.

At 1160, the graphics processor 1102 may output an indication of the set of second BVH structures including the plurality of second nodes based on the configuration of the set of second BVH structures. In some aspects, the graphics processor 1102 may output the indication by transmitting the indication, e.g., to the CPU 1104 at 1164. In some aspects, the graphics processor 1102 may output the indication by storing the indication, e.g., in the memory 1106 or a cache at 1166.

At 1170, the graphics processor 1102 may process data associated with the set of second BVH structures including the plurality of second nodes. For example, in some aspects, the graphics processor 1102 may process (e.g., consume the data) to perform ray tracing, where the graphics processor 1102 determines whether a ray is intersecting with a particular surface of a scene object.

At 1180, the graphics processor 1102 may render, for the set of second frames based on the configuration, the second geometry data based on the set of second BVH structures.

Figure 12:
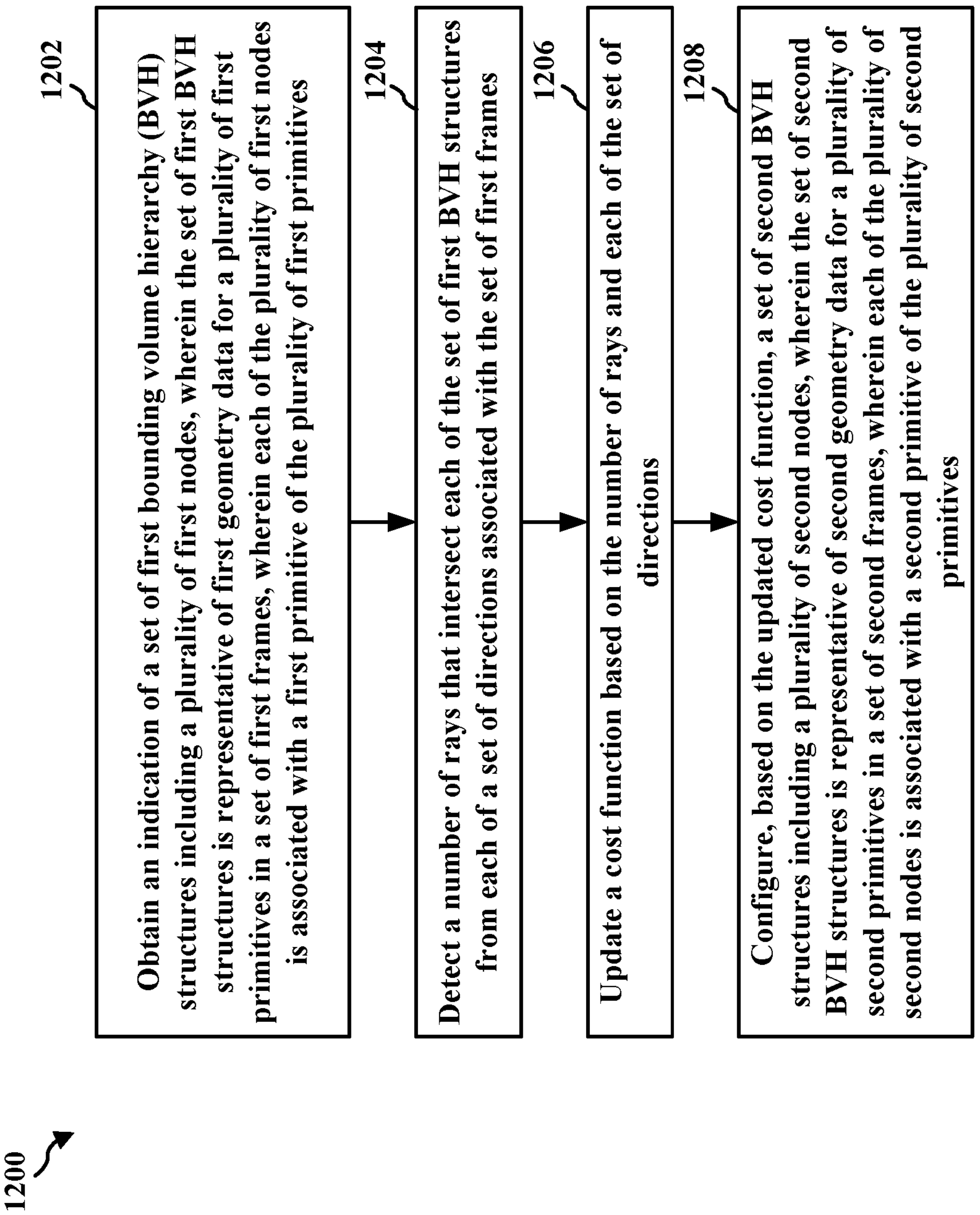
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by a graphics processor, such as an apparatus for graphics processing, a GPU, a CPU, a wireless communication device, and/or any apparatus that may perform graphics processing as used in connection with the examples of FIGS. 1-3, 4A, 4B, 5, 6A, 6B, 7A, 7B, and 8-11.

At 1202, the graphics processor may obtain an indication of a set of first BVH structures including a plurality of first nodes, where the set of first BVH structure is representative of first geometry data for a plurality of first primitives in the set of first frames, where each of the plurality of first nodes is associated with one or more first primitives of the plurality of first primitives, as described in connection with the examples in FIGS. 1-3, 4A, 4B, 5, 6A, 6B, 7A, 7B, and 8-11. For example, as described in 1120 of FIG. 11, the graphics processor 1102 may obtain an indication of a set of first BVH structures including a plurality of first nodes, where the set of first BVH structure is representative of first geometry data for a plurality of first primitives in the set of first frames, where each of the plurality of first nodes is associated with one or more first primitives of the plurality of first primitives. Further, 1202 may be performed by processing unit 120 in FIG. 1.

At 1204, the graphics processor may detect a number of rays that intersect each of the set of first BVH structures from each of a set of directions associated with the set of first frames. In some aspects, the graphics processor 1102 may detect the number of rays by determining that the first geometry data includes the dynamic geometry data and detecting the number of rays based on the determination that the first geometry data includes the dynamic geometry data. For instance, the graphics processor 1102 may detect the number of rays if the first geometry data includes the dynamic geometry data, as described in connection with the examples in FIGS. 1-3, 4A, 4B, 5, 6A, 6B, 7A, 7B, and 8-11. For example, as described in 1130 of FIG. 11, the graphics processor 1102 may determine the number of rays by determining that the first geometry data includes the dynamic geometry data and detecting the number of rays based on the determination that the first geometry data includes the dynamic geometry data. Further, 1204 may be performed by processing unit 120 in FIG. 1.

At 1206, the graphics processor may update a cost function based on the number of rays and each of the set of directions, as described in connection with the examples in FIGS. 1-3, 4A, 4B, 5, 6A, 6B, 7A, 7B, and 8-11. For example, as described in 1130 of FIG. 11, the graphics processor 1102 may update a cost function based on the number of rays and each of the set of directions. Further, 1206 may be performed by processing unit 120 in FIG. 1. In some aspects, the cost function is a surface area heuristic cost function, and the updated cost function is an updated surface area heuristic cost function. In some aspects, the graphics processor may update the cost function by adding a bias to the cost function associated with a certain direction in the set of directions, as described in connection with the examples in FIGS. 1-3, 4A, 4B, 5, 6A, 6B, 7A, 7B, and 8-11. For example, as described in 1130 of FIG. 11, the graphics processor 1102 may add a bias to the cost function associated with a certain direction in the set of directions. For example, the cost function is biased based on the directions from which the rays intersect the scene object.

In some aspects, to update the cost function, the graphics processor (e.g., graphics processor 1102) may identify a first surface area of a first surface (e.g., an xy surface) associated with each of the set of first BVH structures that a first subset of the number of rays intersect; and may identify a second surface area of a second surface (e.g., a yz surface) associated with each of the set of first BVH structures that a second subset of the number of rays intersect. That is, the graphics processor (e.g., graphics processor 1102), for each surface of a particular scene object, may identify the surface area of the surface that a subset of the number of rays intersect. In some aspects, updating the cost function may comprise combining the number of rays that intersect each a set of first frames of the set of first BVH structures from each of the set of directions with at least one of the first surface area or the second surface area. Also, graphics processor (e.g., graphics processor 1102) may identify a third surface area of a third surface (e.g., an xz surface) associated with each of the set of first BVH structures that a third subset of the number of rays intersect. That is, the graphics processor (e.g., graphics processor 1102), for each surface of a particular scene object, may identify the surface area of the surface that a subset of the number of rays intersect. The graphics processor (e.g., graphics processor 1102) may combine the number of rays that intersect each of the set of first BVH structures from each of the set of directions with at least one of the first surface area, the second surface area, or the third surface area. For instance, as shown in Equation 1, the number of rays that intersect a particular BVH structure (representing the scene object) from the x direction (n(x)) may be multiplied by the surface area of the yz surface (S(yz)), the number of rays that intersect the particular BVH structure from the y direction (n(y)) may be multiplied by the surface area of the xz surface (S(xz)), and the number of rays that intersect the particular BVH structure from the z direction (n(z)) may be multiplied by the surface area of the xy surface (S(xy)). The respective products may be summed together and divided by the sum of the number of rays that intersect the particular BVH structure from the x direction (n(x)), the number of rays that intersect the particular BVH structure from the y direction (n(y)), and the number of rays that intersect the particular BVH structure from the z direction (n(z)). In some aspects, the graphics processor (e.g., graphics processor 1102) may output an indication of the combined number of rays that intersect each of the set of first BVH structures from each of the set of directions with at least one of the first surface area, the second surface area, or the third surface area. Moreover, outputting the indication of the combined number of rays may comprise transmitting the indication of the combined number of rays; or storing the indication of the combined number of rays.

In some aspects, the first surface may be associated with a first dimension (e.g., the x dimension) and a second dimension (e.g., the y dimension), the second surface may be associated with the second dimension and a third dimension (e.g., the z dimension), and the third surface is associated with the first dimension and the third dimension.

At 1208, the graphics processor may configure, based on the updated cost function, a set of second BVH structures including a plurality of second nodes, where the set of second BVH structures is representative of second geometry data for a plurality of second primitives in a set of second frames, where each of the plurality of second nodes is associated with one or more second primitives of the plurality of second primitives, as described in connection with the examples in FIGS. 1-3, 4A, 4B, 5, 6A, 6B, 7A, 7B, and 8-11. For example, as described in 1150 of FIG. 11, the graphics processor 1102 may configure, based on the updated cost function, a set of second BVH structures including a plurality of second nodes, where the set of second BVH structures is representative of second geometry data for a plurality of second primitives in a set of second frames, where each of the plurality of second nodes is associated with one or more second primitives of the plurality of second primitives. Further, 1208 may be performed by processing unit 120 in FIG. 1.

In some aspects, the graphics processor may output an indication of the set of second BVH structures including the plurality of second nodes based on the configuration of the set of second BVH structures, as described in connection with the examples in FIGS. 1-3, 4A, 4B, 5, 6A, 6B, 7A, 7B, and 8-11. For example, as described in 1160, the graphics processor 1102 may output an indication of the set of second BVH structures including the plurality of second nodes based on the configuration of the set of second BVH structures. In some aspects, the graphics processor may output the indication by transmitting the indication of the set of second BVH structures, as described in connection with the examples in FIGS. 1-3, 4A, 4B, 5, 6A, 6B, 7A, 7B, and 8-11. For example, as described in 1160, the graphics processor 1102 may output the indication by transmitting the indication, e.g., to the CPU 1104 at 1164. In some aspects, the graphics processor 1102 may output the indication by storing, in a memory or a cache, the indication of the set of second BVH structures, as described in connection with the examples in FIGS. 1-3, 4A, 4B, 5, 6A, 6B, 7A, 7B, and 8-11. For example, as described in 1160, the graphics processor 1102 may store the indication, e.g., in the memory 1106 or a cache at 1166.

In some aspects, the graphics processor may process data associated with the set of second BVH structures including the plurality of second nodes, as described in connection with the examples in FIGS. 1-3, 4A, 4B, 5, 6A, 6B, 7A, 7B, and 8-11. For example, as described in 1170, the graphics processor 1102 may process data associated with the set of second BVH structures including the plurality of second nodes. For example, in some aspects, the graphics processor 1102 may process (e.g., consume the data) to perform ray tracing, where the graphics processor 1102 determines whether a ray is intersecting with a particular surface of a scene object.

In some aspects, the graphics processor may render, for the set of second frames, the second geometry data based on the set of second BVH structures, as described in connection with the examples in FIGS. 1-3, 4A, 4B, 5, 6A, 6B, 7A, 7B, and 8-11. For example, as described in 1180, the graphics processor 1102 may render, for the set of second frames, the second geometry data based on the set of second BVH structures.

Figure 13A:
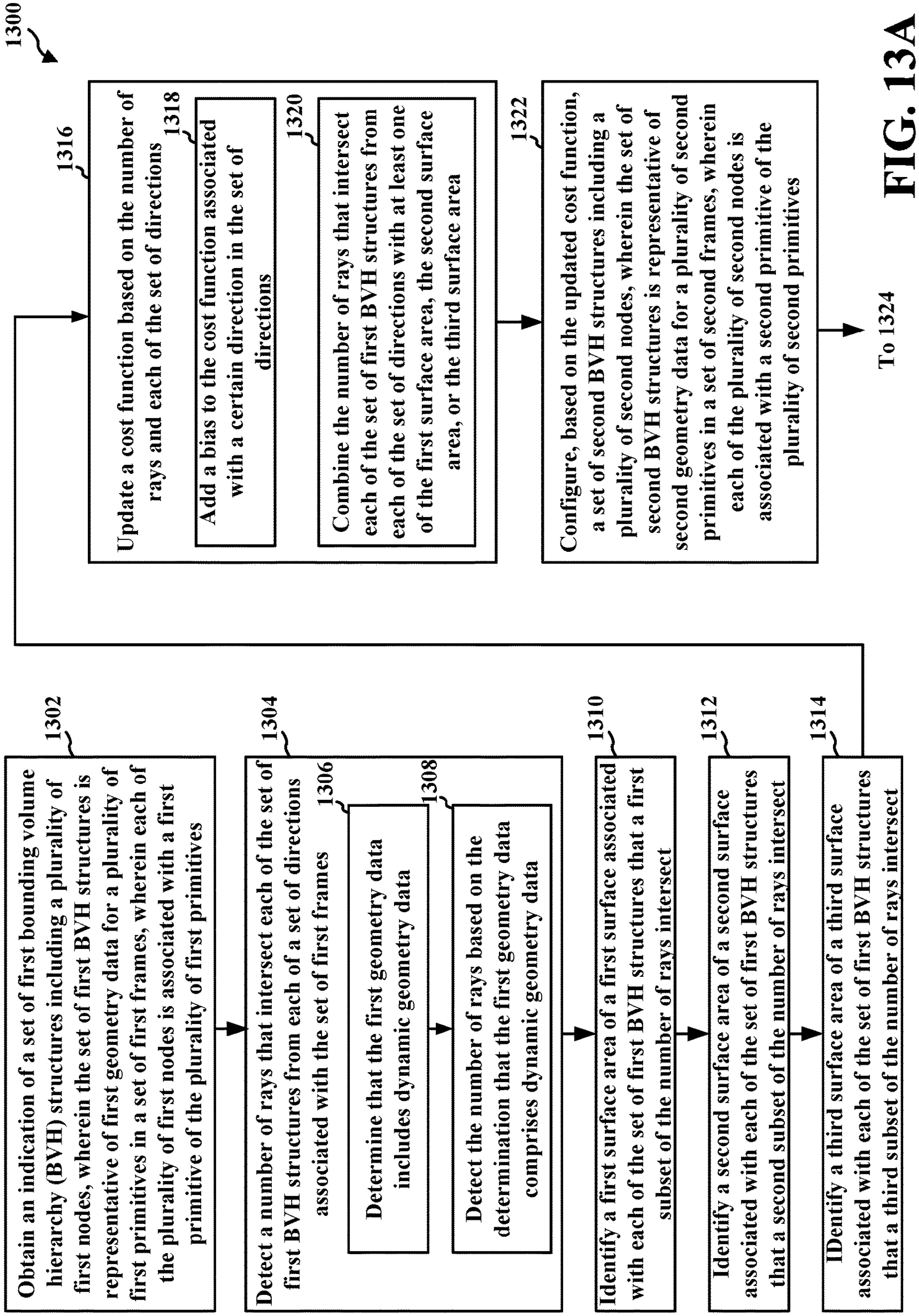
FIG. 13A is a flowchart of an example method of graphics processing in accordance with one or more techniques of this disclosure.
Figure 13B:
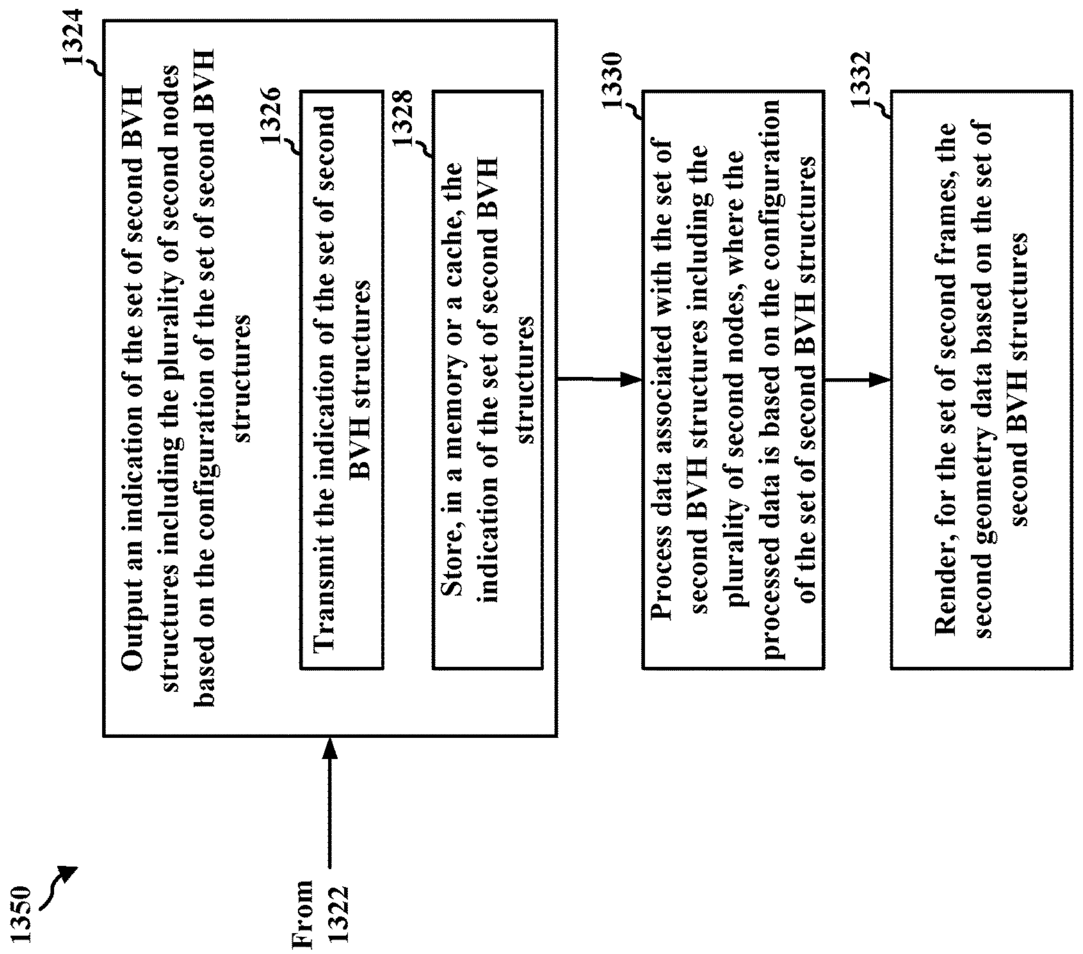
FIG. 13B is a flowchart of an example method of graphics processing in accordance with one or more techniques of this disclosure.

FIGS. 13A and 13B are flowcharts 1300 and 1350 of example methods of graphics processing in accordance with one or more techniques of this disclosure. The method may be performed by a graphics processor, such as an apparatus for graphics processing, a GPU, a CPU, a wireless communication device, and/or any apparatus that may perform graphics processing as used in connection with the examples of FIGS. 1-3, 4A, 4B, 5, 6A, 6B, 7A, 7B, and 8-11.

At 1302, the graphics processor may obtain an indication of a set of first BVH structures including a plurality of first nodes, where the set of first BVH structure is representative of first geometry data for a plurality of first primitives in the set of first frames, where each of the plurality of first nodes is associated with one or more first primitives of the plurality of first primitives, as described in connection with the examples in FIGS. 1-3, 4A, 4B, 5, 6A, 6B, 7A, 7B, and 8-11. For example, as described in 1120 of FIG. 11, the graphics processor 1102 may obtain an indication of a set of first BVH structures including a plurality of first nodes, where the set of first BVH structure is representative of first geometry data for a plurality of first primitives in the set of first frames, where each of the plurality of first nodes is associated with one or more first primitives of the plurality of first primitives. Further, 1302 may be performed by processing unit 120 in FIG. 1.

At 1304, the graphics processor may detect a number of rays that intersect each of the set of first BVH structures from each of a set of directions associated with the set of first frames, as described in connection with the examples in FIGS. 1-3, 4A, 4B, 5, 6A, 6B, 7A, 7B, and 8-11. Further, 1304 may be performed by processing unit 120 in FIG. 1.

In some aspects, as part of 1304, at 1306, the graphics processor 1102 may detect the number of rays by determining that the first geometry data includes dynamic geometry data, as described in connection with the examples in FIGS. 1-3, 4A, 4B, 5, 6A, 6B, 7A, 7B, and 8-11. For example, as described in 1130 of FIG. 11, the graphics processor 1102 may detect the number of rays by determining that the first geometry data includes dynamic geometry data. Further, 1306 may be performed by processing unit 120 in FIG. 1.

In some aspects, as part of 1304, at 1308, the graphics processor 1102 may detect the number of rays based on the determination that the first geometry data includes dynamic geometry data, as described in connection with the examples in FIGS. 1-3, 4A, 4B, 5, 6A, 6B, 7A, 7B, and 8-11. For example, as described in 1130 of FIG. 11, the graphics processor 1102 may detect the number of rays based on the determination that the first geometry data includes dynamic geometry data. Further, 1308 may be performed by processing unit 120 in FIG. 1.

In some aspects, at 1310, to update the cost function, the graphics processor may identify a first surface area of a first surface (e.g., an xy surface) associated with each of the set of first BVH structures that a first subset of the number of rays intersect, as described in connection with the examples in FIGS. 1-3, 4A, 4B, 5, 6A, 6B, 7A, 7B, and 8-11. For example, as described in 1140, the graphics processor 1102 may identify a first surface area of a first surface (e.g., an xy surface) associated with each of the set of first BVH structures that a first subset of the number of rays intersect. Further, 1310 may be performed by processing unit 120 in FIG. 1.

In some aspects, at 1312, to update the cost function, the graphics processor may identify a second surface area of a second surface (e.g., a yz surface) associated with each of the set of first BVH structures that a second subset of the number of rays intersect, as described in connection with the examples in FIGS. 1-3, 4A, 4B, 5, 6A, 6B, 7A, 7B, and 8-11. For example, as described in 1140, the graphics processor 1102 may identify a second surface area of a second surface (e.g., a yz surface) associated with each of the set of first BVH structures that a second subset of the number of rays intersect. Further, 1312 may be performed by processing unit 120 in FIG. 1.

In some aspects, at 1312, to update the cost function, the graphics processor may identify a third surface area of a third surface (e.g., an xz surface) associated with each of the set of first BVH structures that a third subset of the number of rays intersect, as described in connection with the examples in FIGS. 1-3, 4A, 4B, 5, 6A, 6B, 7A, 7B, and 8-11. For example, as described in 1140, the graphics processor 1102 may identify a third surface area of a third surface (e.g., an xz surface) associated with each of the set of first BVH structures that a third subset of the number of rays intersect. Further 1314 may be performed by processing unit 120 in FIG. 1.

At 1316, the graphics processor may update a cost function based on the number of rays and each of the set of directions, as described in connection with the examples in FIGS. 1-3, 4A, 4B, 5, 6A, 6B, 7A, 7B, and 8-11. For example, as described in 1140 of FIG. 11, the graphics processor 1102 may update a cost function based on the number of rays and each of the set of directions. Further, 1316 may be performed by processing unit 120 in FIG. 1.

In some aspects, the cost function is a surface area heuristic cost function, and the updated cost function is an updated surface area heuristic cost function. Further, updating the cost function based on the number of rays and each of the set of directions may comprise updating the SAH cost function based on the number of rays and each of the set of directions.

In some aspects, as part of 1316, at 1318, the graphics processor may update the cost function by adding a bias to the cost function associated with a certain direction in the set of directions, as described in connection with the examples in FIGS. 1-3, 4A, 4B, 5, 6A, 6B, 7A, 7B, and 8-11. For example, as described in 1140 of FIG. 11, the graphics processor 1102 may update the cost function by adding a bias to the cost function associated with a certain direction in the set of directions. Further, 1318 may be performed by processing unit 120 in FIG. 1.

In some aspects, as part of 1316, at 1320 the graphics processor may combine the number of rays that intersect each of the set of first BVH structures from each of the set of directions with at least one of the first surface area, the second surface area, or the third surface area, as described in connection with the examples in FIGS. 1-3, 4A, 4B, 5, 6A, 6B, 7A, 7B, and 8-11. For example, as described in 1140 of FIG. 11, the graphics processor 1102 may combine the number of rays that intersect each of the set of first BVH structures from each of the set of directions with at least one of the first surface area, the second surface area, or the third surface area. Further, 1320 may be performed by processing unit 120 in FIG. 1. For instance, as shown in Equation 1, the number of rays that intersect a particular BVH structure (representing the scene object) from the x direction (n(x)) may be multiplied by the surface area of the yz surface (S(yz)), the number of rays that intersect the particular BVH structure from the y direction (n(y)) may be multiplied by the surface area of the xz surface (S(xz)), and the number of rays that intersect the particular BVH structure from the z direction (n(z)) may be multiplied by the surface area of the xy surface (S(xy)). The respective products may be summed together and divided by the sum of the number of rays that intersect the particular BVH structure from the x direction (n(x)), the number of rays that intersect the particular BVH structure from the y direction (n(y)), and the number of rays that intersect the particular BVH structure from the z direction (n(z)).

In some aspects, the first surface may be associated with a first dimension (e.g., the x dimension) and a second dimension (e.g., the y dimension), the second surface may be associated with the second dimension and a third dimension (e.g., the z dimension), and the third surface is associated with the first dimension and the third dimension.

At 1322, the graphics processor may configure, based on the updated cost function, a set of second BVH structures including a plurality of second nodes, where the set of second BVH structures is representative of second geometry data for a plurality of second primitives in a set of second frames, where each of the plurality of second nodes is associated with one or more second primitives of the plurality of second primitives, as described in connection with the examples in FIGS. 1-3, 4A, 4B, 5, 6A, 6B, 7A, 7B, and 8-11. For example, as described in 1150 of FIG. 11, the graphics processor 1102 may configure, based on the updated cost function, a set of second BVH structures including a plurality of second nodes, where the set of second BVH structures is representative of second geometry data for a plurality of second primitives in a set of second frames, where each of the plurality of second nodes is associated with one or more second primitives of the plurality of second primitives. Further, 1322 may be performed by processing unit 120 in FIG. 1.

In some aspects, at 1324, the graphics processor may output an indication of the set of second BVH structures including the plurality of second nodes based on the configuration of the set of second BVH structures, as described in connection with the examples in FIGS. 1-3, 4A, 4B, 5, 6A, 6B, 7A, 7B, and 8-11. For example, as described in 1160, the graphics processor 1102 may output an indication of the set of second BVH structures including the plurality of second nodes based on the configuration of the set of second BVH structures. Further, 1324 may be performed by processing unit 120 in FIG. 1.

In some aspects, as part of 1324, at 1326, the graphics processor may output the indication by transmitting the indication of the set of second BVH structures, as described in connection with the examples in FIGS. 1-3, 4A, 4B, 5, 6A, 6B, 7A, 7B, and 8-11. For example, as described in 1160, the graphics processor 1102 may output the indication by transmitting the indication, e.g., to the CPU 1104 at 1164. Further, 1326 may be performed by processing unit 120 in FIG. 1.

In some aspects, as part of 1324, at 1328, the graphics processor may output the indication by storing, in a memory or a cache, the indication of the set of second BVH structures, as described in connection with the examples in FIGS. 1-3, 4A, 4B, 5, 6A, 6B, 7A, 7B, and 8-11. For example, as described in 1160, the graphics processor 1102 may output the indication by storing the indication, e.g., in the memory 1106 or a cache at 1166. Further, 1328 may be performed by processing unit 120 in FIG. 1.

In some aspects, at 1330, the graphics processor may process data associated with the set of second BVH structures including the plurality of second nodes, as described in connection with the examples in FIGS. 1-3, 4A, 4B, 5, 6A, 6B, 7A, 7B, and 8-11. For example, as described in 1170, the graphics processor 1102 may process data associated with the set of second BVH structures including the plurality of second nodes. For example, in some aspects, the graphics processor 1102 may process (e.g., consume the data) to perform ray tracing, where the graphics processor 1102 determines whether a ray is intersecting with a particular surface of a scene object. Further, 1330 may be performed by processing unit 120 in FIG. 1.

In some aspects at 1332, the graphics processor may render, for the set of second frames based on the configuration, the second geometry data based on the set of second BVH structures, as described in connection with the examples in FIGS. 1-3, 4A, 4B, 5, 6A, 6B, 7A, 7B, and 8-11. For example, as described in 1180, the graphics processor 1102 may render, for the set of second frames, the second geometry data based on the set of second BVH structures. Further, 1332 may be performed by processing unit 120 in FIG. 1.

In configurations, a method or an apparatus for graphics processing is provided. The apparatus may be a graphics processor (e.g., a GPU), or some other processor that may perform graphics processing. In aspects, the apparatus may be the processing unit 120 within the device 104, or may be some other hardware within the device 104 or another device. The apparatus, e.g., processing unit 120, may include means for obtaining an indication of a set of first bounding volume hierarchy (BVH) structures including a plurality of first nodes, where the set of first BVH structures is representative of first geometry data for a plurality of first primitives in a set of first frames, where each of the plurality of first nodes is associated with one or more first primitives of the plurality of first primitives, means for detecting a number of rays that intersect each of the set of first BVH structures from each of a set of directions associated with the set of first frames, means for updating a cost function based on the number of rays and each of the set of directions, and means for configuring, based on the updated cost function, a set of second BVH structures including a plurality of second nodes, where the set of second BVH structures is representative of second geometry data for a plurality of second primitives in a set of second frames, where each of the plurality of second nodes is associated with one or more second primitives of the plurality of second primitives. The apparatus may further include means for outputting an indication of the set of second BVH structures including the plurality of second nodes based on the configuration of the set of second BVH structures. The means for outputting the indication of the set of second BVH structures may include means for transmitting the indication of the set of second BVH structures. The means for outputting the indication of the set of second BVH structures may include means for storing, in a memory or a cache, the indication of the set of second BVH structures. The apparatus may further include means for rendering, for the set of second frames, the second geometry data based on the set of second BVH structures. The apparatus may further include means for processing data associated with the set of second BVH structures including the plurality of second nodes, where the processed data is based on the configuration of the set of second BVH structures. The apparatus may further include means for identifying a first surface area of a first surface associated with each of the set of first BVH structures that a first subset of the number of rays intersect, means for identifying a second surface area of a second surface associated with each of the set of first BVH structures that a second subset of the number of rays intersect, and means for identifying a third surface area of a third surface associated with each of the set of first BVH structures that a third subset of the number of rays intersect. The means for updating the cost function may include means for combining the number of rays that intersect each of the set of first BVH structures from each of the set of directions with at least one of the first surface area, the second surface area, or the third surface area. The means for detecting the number of rays that intersect each of the set of first BVH structures from each of the set of directions associated with the set of first frames may include means for determining that the first geometry data includes the dynamic geometry data and means for detecting the number of rays based on the determination that the first geometry data includes the dynamic geometry data.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method for graphics processing, comprising: obtaining an indication of a set of first bounding volume hierarchy (BVH) structures including a plurality of first nodes, wherein the set of first BVH structures is representative of first geometry data for a plurality of first primitives in a set of first frames, wherein each of the plurality of first nodes is associated with one or more first primitives of the plurality of first primitives; detecting a number of rays that intersect each of the set of first BVH structures from each of a set of directions associated with the set of first frames; updating a cost function based on the number of rays and each of the set of directions; and configuring, based on the updated cost function, a set of second BVH structures including a plurality of second nodes, wherein the set of second BVH structures is representative of second geometry data for a plurality of second primitives in a set of second frames, and wherein each of the plurality of second nodes is associated with one or more second primitives of the plurality of second primitives.

Aspect 2 is the method of aspect 1, further comprising: outputting an indication of the set of second BVH structures including the plurality of second nodes based on the configuration of the set of second BVH structures Aspect 3 is the method of any of aspects 1 and 2, wherein outputting the indication of the set of second BVH structures comprises: transmitting the indication of the set of second BVH structures; or storing, in a memory or a cache, the indication of the set of second BVH structures.

Aspect 4 is the method of any of aspects 1 to 3, further comprising: rendering, for the set of second frames based on the configuration, the second geometry data based on the set of second BVH structures.

Aspect 5 is the method of any of aspects 1 to 4, further comprising: processing data associated with the set of second BVH structures including the plurality of second nodes, wherein the processed data is based on the configuration of the set of second BVH structures.

Aspect 6 is the method of any of aspects 1 to 5, wherein the cost function is a surface area heuristic (SAH) cost function, and wherein updating the cost function based on the number of rays and each of the set of directions comprises updating the SAH cost function based on the number of rays and each of the set of directions.

Aspect 7 is the method of any of aspects 1 to 6, wherein updating the cost function comprises: adding a bias to the cost function associated with a certain direction in the set of directions.

Aspect 8 is the method of any of aspects 1 to 7, further comprising: identifying a first surface area of a first surface; and identifying a second surface area of a second surface associated with each of the set of first BVH structures that a second subset of the number of rays intersect.

Aspect 9 is the method of aspect 8, wherein updating the cost function comprises: combining the number of rays that intersect each of the set of first BVH structures from each of the set of directions with at least one of the first surface area or the second surface area.

Aspect 10 is the method of aspect 8, further comprising: identifying a third surface area of a third surface associated with each of the set of first BVH structures that a third subset of the number of rays intersect.

Aspect 11 is the method of aspect 10, wherein updating the cost function comprises: combining the number of rays that intersect each of the set of first BVH structures from each of the set of directions with at least one of the first surface area, the second surface area, or the third surface area.

Aspect 12 is the method of aspect 11, further comprising: outputting an indication of the combined number of rays that intersect each of the set of first BVH structures from each of the set of directions with at least one of the first surface area, the second surface area, or the third surface area.

Aspect 13 is the method of aspect 12, wherein outputting the indication of the combined number of rays comprises: transmitting the indication of the combined number of rays; or storing the indication of the combined number of rays.

Aspect 14 is the method of any of aspects 10 to 13, wherein the first surface is associated with a first dimension and a second dimension, wherein the second surface is associated with the second dimension and a third dimension, and wherein the third surface is associated with the first dimension and the third dimension.

Aspect 15 is the method of any of aspects 1 to 14, wherein detecting the number of rays that intersect each of the set of first BVH structures from each of the set of directions associated with the set of first frames comprises: determining that the first geometry data comprises dynamic geometry data; and detecting the number of rays based on the determination that the first geometry data comprises the dynamic geometry data.

Aspect 16 is an apparatus for graphics processing comprising a processor coupled to a memory and, based on information stored in the memory, the processor is configured to implement a method as in any of aspects 1 to 15.

Aspect 17 may be combined with aspect 16 and includes that the apparatus is a wireless communication device comprising at least one of a transceiver or an antenna.

Aspect 18 is an apparatus for graphics processing including means for implementing a method as in any of aspects 1 to 15.

Aspect 19 is a computer-readable medium (e.g., a non-transitory computer-readable medium) storing computer executable code, the computer executable code, when executed by a processor, causes the processor to implement a method as in any of aspects 1 to 15.

Various aspects have been described herein. These and other aspects are within the scope of the following claims.

What is claimed is:

1. An apparatus for graphics processing, comprising:

a memory; and a processor coupled to the memory and, based on information stored in the memory, the processor is configured to:

obtain a set of first bounding volume hierarchy (BVH) structures including a plurality of first nodes, wherein each first BVH structure of the set of first BVH structures comprises a set of surfaces, wherein the set of surfaces comprises a first surface associated with rays intersecting from an x-direction, a second surface associated with rays intersecting from a y-direction, and a third surface associated with rays intersecting from a z-direction, wherein the set of first BVH structures is representative of first geometry data for a plurality of first primitives in a set of first frames, wherein each of the plurality of first nodes is associated with a first primitive of the plurality of first primitives;

detect, for a first BVH structure of the set of first BVH structures, a first number of rays that intersect the first surface of the set of surfaces associated with the first BVH structure of the set of first BVH structures, a second number of rays that intersect the second surface of the set of surfaces associated with the first BVH structure of the set of first BVH structures, a third number of rays that intersect the third surface of the set of surfaces associated with the first BVH structure of the set of first BVH structures;

update a cost function based on a first combination of the first number of rays that intersect the first surface of the set of surfaces and a first surface area of the first surface, the first number of rays that intersect the first surface of the set of surfaces, a second combination of the second number of rays that intersect the second surface of the set of surfaces and a second surface area of the second surface, the second number of rays that intersect the second surface of the set of surfaces, a third combination of the third number of rays that intersect the third surface of the set of surfaces and a third surface area of the third surface, and the third number of rays that intersect the third surface of the set of surfaces; and configure, based on the updated cost function, a set of second BVH structures including a plurality of second nodes, wherein the set of second BVH structures is representative of second geometry data for a plurality of second primitives in a set of second frames, and wherein each of the plurality of second nodes is associated with a second primitive of the plurality of second primitives.

2. The apparatus of claim 1, wherein the processor is configured to:

output the set of second BVH structures including the plurality of second nodes based on the configured set of second BVH structures.

3. The apparatus of claim 2, wherein, to output the set of second BVH structures, the processor is configured to:

transmit the set of second BVH structures; or store, in a first memory or a first cache, the set of second BVH structures.

4. The apparatus of claim 1, wherein the processor is configured to:

render, for the set of second frames based on the configured set of second BVH structures, the second geometry data based on the set of second BVH structures.

5. The apparatus of claim 1, wherein the processor is configured to:

process data associated with the set of second BVH structures including the plurality of second nodes, wherein the processed data is based on the configured set of second BVH structures.

6. The apparatus of claim 1, wherein the cost function is a surface area heuristic (SAH) cost function, and wherein, to update the cost function based on the first combination, the first number of rays, the second combination, the second number of rays, the third combination, and the third number of rays, the processor is configured to update the SAH cost function based on the first combination, the first number of rays, the second combination, the second number of rays, the third combination, and the third number of rays.

7. The apparatus of claim 1, wherein, to update the cost function, the processor is configured to add a bias to the cost function associated with a certain surface in the set of surfaces.

8. The apparatus of claim 1, wherein, to update the cost function associated with the first BVH structure in the set of first BVH structures, the processor is configured to:

identify, for the first BVH structure, the first surface area of the first surface in the set of surfaces and the first number of rays that intersect the first surface; and identify, for the first BVH structure, the second surface area of the second surface in the set of surfaces and the second number of rays that intersect the second surface.

9. The apparatus of claim 8, wherein the first combination is a first product, the second combination is a second product, and wherein, to update the cost function associated with the first BVH structure in the set of first BVH structures, the processor is configured to:

multiply, to calculate the first product, the first number of rays by the first surface area; and multiply, to calculate the second product, the second number of rays by the second surface area.

10. The apparatus of claim 9, wherein, to update the cost function associated with the first BVH structure in the set of first BVH structures, the processor is further configured to:

identify, for the first BVH structure, the third surface area of the third surface in the set of surfaces and the third number of rays that intersect the third surface.

11. The apparatus of claim 10, wherein the third combination is a third product and wherein, to update the cost function associated with the first BVH structure in the set of first BVH structures, the processor is further configured to:

multiply, to calculate the third product, the third number of rays by the third surface area.

12. The apparatus of claim 11, wherein the processor is further configured to:

output the updated cost function associated with the first BVH structure.

13. The apparatus of claim 12, wherein, to output the updated cost function associated with the first BVH structure, the processor is configured to:

transmit the updated cost function; or store the updated cost function.

14. The apparatus of claim 10, wherein the first surface is a planar surface in a yz plane, wherein the second surface is a planar surface in an xz plane, and wherein the third surface is a planar surface in an xy plane.

15. The apparatus of claim 1, wherein, to detect the first number of rays, the second number of rays, and the third number of rays, the processor is configured to:

determine that the first geometry data comprises dynamic geometry data; and detect the first number of rays, the second number of rays, and the third number of rays based on the determination that the first geometry data comprises the dynamic geometry data.

16. The apparatus of claim 1, wherein the apparatus is a wireless communication device comprising at least one of a transceiver or an antenna.

17. A method of graphics processing, comprising:

obtaining a set of first bounding volume hierarchy (BVH) structures including a plurality of first nodes, wherein each first BVH structure of the set of first BVH structures comprises a set of surfaces, wherein the set of surfaces comprises a first surface associated with rays intersecting from an x-direction, a second surface associated with rays intersecting from a y-direction, and a third surface associated with rays intersecting from a z-direction, wherein the set of first BVH structures is representative of first geometry data for a plurality of first primitives in a set of first frames, wherein each of the plurality of first nodes is associated with a first primitive of the plurality of first primitives;

detecting, for a first BVH structure of the set of first BVH structures, a first number of rays that intersect the first surface of the set of surfaces associated with the first BVH structure of the set of first BVH structures, a second number of rays that intersect the second surface of the set of surfaces associated with the first BVH structure of the set of first BVH structures, a third number of rays that intersect the third surface of the set of surfaces associated with the first BVH structure of the set of first BVH structures;

updating a cost function based on a first combination of the first number of rays that intersect the first surface of the set of surfaces and a first surface area of the first surface, the first number of rays that intersect the first surface of the set of surfaces, a second combination of the second number of rays that intersect the second surface of the set of surfaces and a second surface area of the second surface, the second number of rays that intersect the second surface of the set of surfaces, a third combination of the third number of rays that intersect the third surface of the set of surfaces and a third surface area of the third surface, and the third number of rays that intersect the third surface of the set of surfaces; and configuring, based on the updated cost function, a set of second BVH structures including a plurality of second nodes, wherein the set of second BVH structures is representative of second geometry data for a plurality of second primitives in a set of second frames, and wherein each of the plurality of second nodes is associated with a second primitive of the plurality of second primitives.

18. The method of claim 17, further comprising:

outputting the set of second BVH structures including the plurality of second nodes based on the configured set of second BVH structures.

19. The method of claim 18, wherein outputting the set of second BVH structures comprises:

transmitting the set of second BVH structures; or storing, in a memory or a cache, the set of second BVH structures.

20. The method of claim 17, further comprising:

rendering, for the set of second frames based on the configured set of second BVH structures, the second geometry data based on the set of second BVH structures.

21. The method of claim 17, further comprising:

processing data associated with the set of second BVH structures including the plurality of second nodes, wherein the processed data is based on the configured set of second BVH structures.

22. The method of claim 17, wherein the cost function is a surface area heuristic (SAH) cost function, and wherein updating the cost function based on the first combination, the first number of rays, the second combination, the second number of rays, the third combination, and the third number of rays comprises updating the SAH cost function based on the first combination, the first number of rays, the second combination, the second number of rays, the third combination, and the third number of rays.

23. The method of claim 17, wherein updating the cost function comprises:

adding a bias to the cost function associated with a certain surface in the set of surfaces.

24. The method of claim 17, wherein updating the cost function associated with the first BVH structure in the set of first BVH structures comprises:

identifying, for the first BVH structure, the first surface area of the first surface in the set of surfaces and the first number of rays that intersect the first surface; and identifying, for the first BVH structure, the second surface area of the second surface in the set of surfaces and the second number of rays that intersect the second surface.

25. The method of claim 24, wherein the first combination is a first product, the second combination is a second product, and wherein updating the cost function associated with the first BVH structure in the set of first BVH structures comprises:

multiplying, to calculate the first product, the first number of rays by the first surface area; and multiplying, to calculate the second product, the second number of rays by the second surface area.

26. The method of claim 25, wherein updating the cost function associated with the first BVH structure in the set of first BVH structures comprising:

identifying, for the first BVH structure, the third surface area of the third surface in the set of surfaces and the third number of rays that intersect the third surface.

27. The method of claim 26, wherein the third combination is a third product and wherein updating the cost function associated with the first BVH structure in the set of first BVH structures further comprises:

multiplying, to calculate the third product, the third number of rays by the third surface area.

28. The method of claim 26, wherein the first surface is a planar surface in a yz plane, wherein the second surface is a planar surface in an xz plane, and wherein the third surface is a planar surface in an xy plane.

29. The method of claim 17, wherein detecting the first number of rays, the second number of rays, and the third number of rays comprises:

determining that the first geometry data comprises dynamic geometry data; and detecting the first number of rays, the second number of rays, and the third number of rays based on the determination that the first geometry data comprises the dynamic geometry data.

30. A non-transitory computer-readable medium storing computer executable code, the computer executable code, when executed by a processor, causes the processor to:

obtain a set of first bounding volume hierarchy (BVH) structures including a plurality of first nodes, wherein each first BVH structure of the set of first BVH structures comprises a set of surfaces, wherein the set of surfaces comprises a first surface associated with rays intersecting from an x-direction, a second surface associated with rays intersecting from a y-direction, and a third surface associated with rays intersecting from a z-direction, wherein the set of first BVH structures is representative of first geometry data for a plurality of first primitives in a set of first frames, wherein each of the plurality of first nodes is associated with a first primitive of the plurality of first primitives;

detect, for a first BVH structure of the set of first BVH structures, a first number of rays that intersect the first surface of the set of surfaces associated with the first BVH structure of the set of first BVH structures, a second number of rays that intersect the second surface of the set of surfaces associated with the first BVH structure of the set of first BVH structures, a third number of rays that intersect the third surface of the set of surfaces associated with the first BVH structure of the set of first BVH structures;

update a cost function based on a first combination of the first number of rays that intersect the first surface of the set of surfaces and a first surface area of the first surface, the first number of rays that intersect the first surface of the set of surfaces, a second combination of the second number of rays that intersect the second surface of the set of surfaces and a second surface area of the second surface, the second number of rays that intersect the second surface of the set of surfaces, a third combination of the third number of rays that intersect the third surface of the set of surfaces and a third surface area of the third surface, and the third number of rays that intersect the third surface of the set of surfaces; and configure, based on the updated cost function, a set of second BVH structures including a plurality of second nodes, wherein the set of second BVH structures is representative of second geometry data for a plurality of second primitives in a set of second frames, and wherein each of the plurality of second nodes is associated with a second primitive of the plurality of second primitives.

* * * * *